United States Patent
Yoo et al.

(10) Patent No.: US 11,046,310 B2
(45) Date of Patent: Jun. 29, 2021

(54) METHOD OF PLANNING TRAVELING PATH AND ELECTRONIC DEVICE THEREFOR

(71) Applicant: SAMSUNG ELECTRONICS CO., LTD., Suwon-si (KR)

(72) Inventors: Jinwoo Yoo, Suwon-si (KR); Aron Baik, Suwon-si (KR); Changsoo Park, Suwon-si (KR); Inhak Na, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 216 days.

(21) Appl. No.: 16/283,910

(22) Filed: Feb. 25, 2019

(65) Prior Publication Data
US 2019/0263401 A1 Aug. 29, 2019

(30) Foreign Application Priority Data

Feb. 27, 2018 (KR) .......................... 10-2018-0023892

(51) Int. Cl.
| | |
|---|---|
| *B60W 30/16* | (2020.01) |
| *G08G 1/16* | (2006.01) |
| *B60W 30/18* | (2012.01) |
| *B60W 30/095* | (2012.01) |
| *B60W 30/09* | (2012.01) |

(52) U.S. Cl.
CPC ............ *B60W 30/16* (2013.01); *B60W 30/09* (2013.01); *B60W 30/0956* (2013.01); *B60W 30/18163* (2013.01); *G08G 1/167* (2013.01); *B60W 2554/801* (2020.02)

(58) Field of Classification Search
CPC .... B60W 30/16; B60W 30/18; B60W 30/095; B60W 30/09; G08G 1/16; G08G 1/166; G08G 1/161; G08G 9/02
See application file for complete search history.

(56) References Cited

U.S. PATENT DOCUMENTS

| | | | |
|---|---|---|---|
| 9,280,899 B2 | 3/2016 | Biess et al. | |
| 9,487,212 B1 | 11/2016 | Adam et al. | |
| 9,744,969 B2 * | 8/2017 | Kim ................ | B60W 30/18163 |
| 10,019,011 B1 * | 7/2018 | Green ............... | B60W 30/0953 |

(Continued)

FOREIGN PATENT DOCUMENTS

| | | |
|---|---|---|
| EP | 2 995 519 A1 | 3/2016 |
| JP | 2011-204125 | 10/2011 |
| JP | 2015-230675 | 12/2015 |

OTHER PUBLICATIONS

Search Report and Written Opinnion dated May 27, 2019 in counterpart International Patent Application No. PCT/KR2019/002286.

(Continued)

*Primary Examiner* — Tan Q Nguyen
(74) *Attorney, Agent, or Firm* — Nixon & Vanderhye P.C.

(57) ABSTRACT

Provided is a method including detecting at least one external vehicle located within a predetermined distance from a first vehicle using at least one sensor; determining a risk due to the at least one external vehicle based on a type of the at least one external vehicle; and planning a traveling path of the first vehicle based on the risk due to the at least one external vehicle.

20 Claims, 22 Drawing Sheets

(56) References Cited

U.S. PATENT DOCUMENTS

| | | | | |
|---|---|---|---|---|
| 2012/0078498 | A1* | 3/2012 | Iwasaki | B60W 10/06 |
| | | | | 701/300 |
| 2013/0151058 | A1* | 6/2013 | Zagorski | B60W 30/0956 |
| | | | | 701/23 |
| 2013/0282277 | A1* | 10/2013 | Rubin | G08G 1/167 |
| | | | | 701/517 |
| 2015/0224998 | A1 | 8/2015 | Buerkle et al. | |
| 2015/0321699 | A1* | 11/2015 | Rebhan | B60W 10/20 |
| | | | | 701/23 |
| 2015/0345961 | A1* | 12/2015 | Oooka | B60W 30/143 |
| | | | | 701/25 |
| 2016/0082978 | A1* | 3/2016 | Ozaki | B60W 50/14 |
| | | | | 701/58 |
| 2016/0214607 | A1 | 7/2016 | Dolgov et al. | |
| 2016/0272207 | A1 | 9/2016 | Dolgov et al. | |
| 2017/0206789 | A1 | 7/2017 | Shimizu et al. | |
| 2017/0210359 | A1 | 7/2017 | Brandin | |
| 2017/0262790 | A1 | 9/2017 | Khasis | |
| 2018/0025643 | A1* | 1/2018 | Yamamoto | B60W 30/09 |
| | | | | 701/23 |

OTHER PUBLICATIONS

Extended European Search Report dated Oct. 16, 2020 for EP Application No. 19761183.3.

* cited by examiner

METHOD OF PLANNING TRAVELING PATH AND ELECTRONIC DEVICE THEREFOR

CROSS-REFERENCE TO RELATED APPLICATION

This application is based on and claims priority under 35 U.S.C. § 119 to Korean Patent Application No. 10-2018-0023892, filed on Feb. 27, 2018, in the Korean Intellectual Property Office, the disclosure of which is incorporated by reference herein in its entirety.

BACKGROUND

1. Field

The disclosure relates to a method of planning a traveling path according to a type of a nearby vehicle and an electronic device therefor.

2. Description of Related Art

As interest in autonomous vehicles increases, technologies that enable autonomous traveling are attracting attention. In order for a vehicle to move itself without manipulation by a driver, a technology of perceiving an external environment of the vehicle, a technology of determining operations such as acceleration, stopping, turning, etc. by summarizing perceived information and determining a traveling path, and a technology of controlling a movement of the vehicle using determined information, etc. are needed. Although all technologies have to be combined organically for autonomous traveling, the technology of perceiving the external environment of the vehicle is increasingly important. Perceiving the external environment is not only a first element of autonomous traveling, but also requires fusion with electronics and IT technology to perceive the external environment.

The technology of perceiving the external environment may be roughly divided into two types, a sensor-based perception technology and a connection-based perception technology. There are ultrasonic sensors, cameras, radars, and lidars installed in vehicles for autonomous traveling. These sensors may be mounted on the vehicle to perceive the external environment of the vehicle and terrain alone or along with other sensors and provide information to a driver and the vehicle.

The connection-based perception technology for autonomous traveling includes V2X and precision positioning technology. V2X refers to vehicle to something which includes vehicle to vehicle (V2V) for communicating between vehicles, vehicle to infrastructure (V2I) for communicating with infrastructure, and vehicle to pedestrian (V2P) for communicating with pedestrians. V2X may refer to a wireless communication technology that connects a traveling vehicle with surrounding vehicles, transportation infrastructure and nearby pedestrians. V2X may communication of information such as position, distance, and speed among vehicles and provide information such as surrounding traffic and positions of pedestrians to vehicles through a connected communication network.

SUMMARY

Example embodiments provide a path planning method of determining a risk due to a nearby vehicle according to a type of the nearby vehicle and searching for a safe maneuver in complicated and various road situations in consideration of the risk due to the nearby vehicle, and an electronic device therefor.

Additional aspects will be set forth in part in the description which follows and, in part, will be apparent from the description.

In accordance with an example aspect of the disclosure, a method of planning a traveling path of a first vehicle, performed by a device included in the first vehicle, includes perceiving (detecting) at least one external vehicle located within a predetermined distance from the first vehicle using at least one sensor; determining a risk due to the at least one external vehicle based on a type of the at least one external vehicle; and planning the traveling path of the first vehicle based on the risk due to the at least one external vehicle.

In accordance with another example aspect of the disclosure, a device included in a first vehicle includes a sensing unit including at least one sensor; and a processor configured to perceive (e.g., detect) at least one external vehicle located within a predetermined distance from the first vehicle using the at least one sensor, to determine a risk due to the at least one external vehicle based on a type of the at least one external vehicle; and to plan a traveling path of the first vehicle based on the risk due to the at least one external vehicle.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
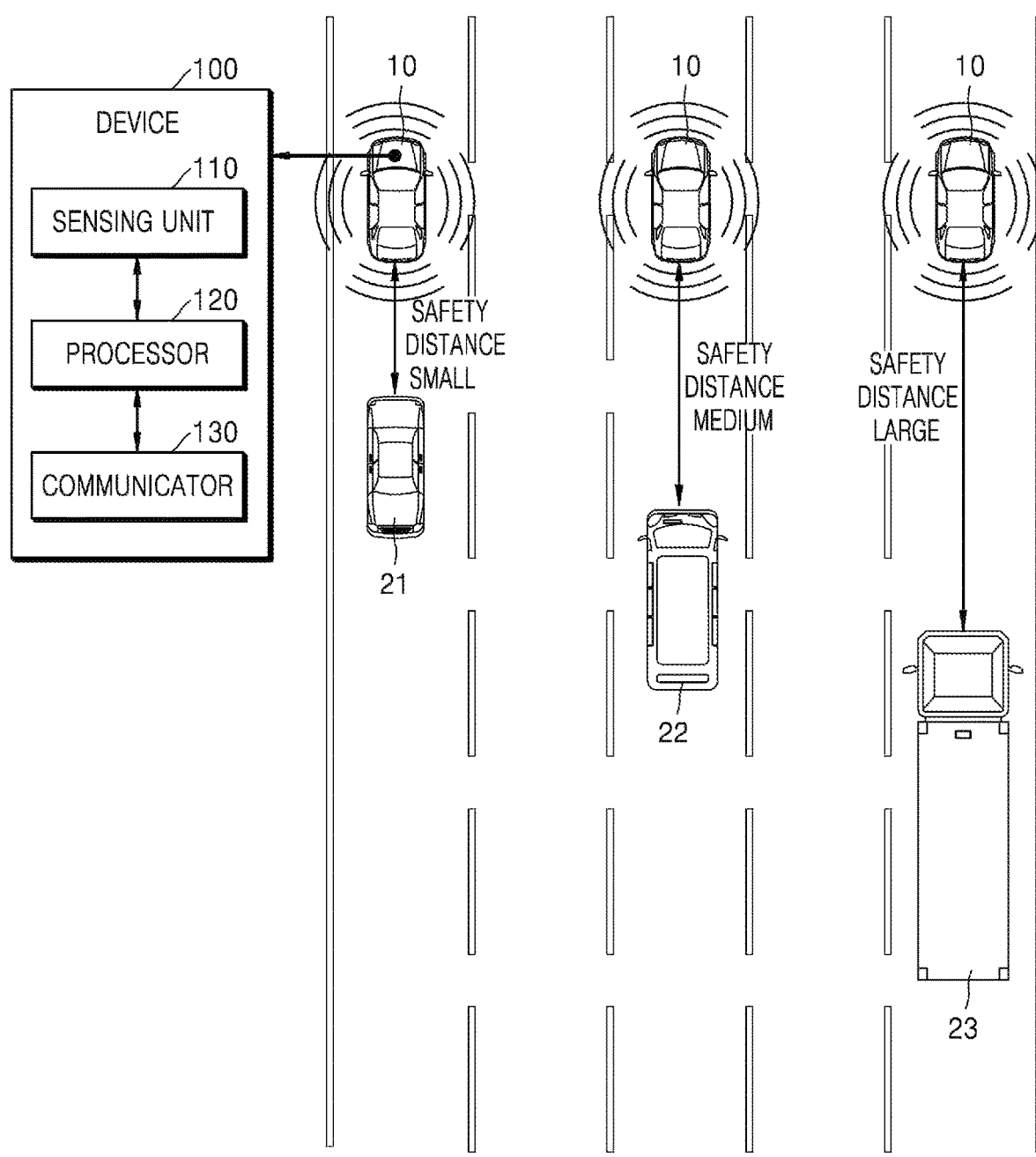
FIG. 1 is a diagram illustrating an example system for planning a traveling path of a vehicle, according to an embodiment.

The terms used in the disclosure will be briefly described, and various example embodiments of the present disclosure will be described in greater detail.

The terms used in the present disclosure are selected from among common terms that are currently widely used in consideration of their functions in the present disclosure. However, the terms may be different according to the intention of one of ordinary skill in the art, a precedent, or the advent of new technology. Also, in particular cases, some terms may be arbitrarily selected, and the meaning of those terms will be described in the corresponding part of the disclosure. Therefore, the terms used in the present disclosure are not merely designations of the terms, but the terms are defined based on the meaning of the terms and content throughout the present disclosure.

Throughout the present disclosure, when a part "includes" an element, it is to be understood that the part may additionally include other elements rather than excluding other elements as long as there is no particular opposing recitation. Also, the terms such as " . . . unit", "module", or the like used in the present disclosure may refer, for example, to a unit, which processes at least one function or motion, and the unit may be implemented by hardware or software, or by any combination of hardware and software.

Embodiments of the present disclosure will be described in greater detail in order to fully convey the scope of the present disclosure and enable one of ordinary skill in the art to practice the present disclosure. The present disclosure may, however, be embodied in many different forms and should not be understood as being limited to the various example embodiments set forth herein. Also, parts in the drawings unrelated to the detailed description may be omitted for clarity of the present disclosure. Like reference numerals in the drawings denote like elements.

FIG. 1 is a diagram illustrating an example system for planning a traveling path of a vehicle according to an embodiment.

According to an embodiment, the system for planning the traveling path of the vehicle (hereinafter referred to as a motion planning system) may include a vehicle traveling assistance device (hereinafter referred to as a "device") 100. The device 100 may be a device for perceiving a surrounding environment of a first vehicle 10 and planning a traveling path of the first vehicle 10. The first vehicle 10 may be an autonomous vehicle, but is not limited thereto. For example, the first vehicle 10 may be a vehicle using the advanced driver assistance systems (ADAS).

According to an embodiment, the device 100 may include a sensing unit (e.g., including at least one sensor and/or sensing circuitry) 110 and a processor (e.g., including processing circuitry) 120. The device 100 may perceive (detect) at least one external vehicle existing within a predetermined distance from the first vehicle 10 through the sensing unit 110. The at least one external vehicle may, for example, and without limitation, be a vehicle traveling in the same lane as the first vehicle 10, a vehicle traveling in a different lane from the first vehicle 10, a stationary vehicle, or the like, but is not limited thereto. Also, the device 100 may perceive a surrounding environment of the first vehicle 10 at 360 degrees using the sensing unit 110.

According to an embodiment, the sensing unit 110 may include various sensors and/or sensing circuitry, such as, for example, and without limitation, at least one of an image sensor (e.g., a front stereo camera, an around view camera, etc.), a light detecting and ranging (LiDAR) sensor, a radio detecting and ranging (Radar) sensor, an ultrasound sensor, an infrared sensor (e.g., a thermal detection infrared camera), a laser scanner, a depth sensor, a position sensor (e.g., a global positioning system (GPS), a differential GPS (DGPS), an inertial navigation system (INS), or the like, but is not limited thereto.

According to an embodiment, the processor 120 may include various processing circuitry and analyze image information transferred through the sensing unit 110 to identify at least one external vehicle (e.g., a second vehicle 21, a third vehicle 22, and a fourth vehicle 23) located around the first vehicle 10. For example, the processor 120 may determine a type of each of the second vehicle 21, the third vehicle 22, and the fourth vehicle 23. The processor 120 may then determine a risk of each of the second vehicle 21, the third vehicle 22, and the fourth vehicle 23 according to the determined type. For example, when the second vehicle 21 is a small vehicle, the third vehicle 22 is a medium vehicle, and the fourth vehicle 23 is a large vehicle, the processor 120 may determine that the risk of the third vehicle 22 is higher than the risk of the third vehicle 22 and the risk of the fourth vehicle 23 is higher than the risk of the third vehicle 22.

According to an embodiment, the processor 120 may identify at least one external vehicle (e.g., the second vehicle 21, the third vehicle 22, and the fourth vehicle 23) located near the first vehicle 10 through a communicator 130. For example, the communicator 130 may include various communication circuitry and obtain identification information (e.g., a type of a vehicle, a size of the vehicle, a position of the vehicle, etc.) of at least one external vehicle broadcasted or advertised in the at least one external vehicle using vehicle to vehicle (V2V) technology, vehicle to infrastructure (V2I) technology, and vehicle to pedestrian (V2P) technology. The communicator 130 may transmit the obtained identification information of the at least one external vehicle to the processor 120. The processor 120 may determine the risk of the at least one external vehicle based on the identification information of the at least one external vehicle.

The processor 120 may also plan the traveling path of the first vehicle 10 in consideration of the risk of the at least one external vehicle (for example, the second vehicle 21, the third vehicle 22 and the fourth vehicle 23). According to an embodiment, the traveling path of the first vehicle 10 may include, for example, and without limitation, at least one of a motion of maintaining a current state of the first vehicle 10, a motion of changing lanes of the first vehicle 10, a motion of decelerating or accelerating the first vehicle 10, a motion of stopping the first vehicle 10, or the like, but is not limited thereto. For example, the processor 120 may define a safety distance between an external vehicle and the first vehicle 10 to be longer as a risk of the external vehicle increases, and when the external vehicle enters the safety distance, may plan the traveling path of changing lanes of the first vehicle 10 or decelerating or accelerating the speed of the first vehicle 10. The safety distance may refer, for example, to a necessary distance of a vehicle to avoid a collision with a front vehicle traveling in the same direction when the front vehicle suddenly stops. According to an embodiment, the safety distance may vary depending on a traveling speed of the vehicle. In the present disclosure, when there is no specific mention of the traveling speed of the vehicle, the safety distance may refer, for example, to a distance of the vehicle to avoid the collision with the front vehicle when the vehicle travels according to a speed limit or an average speed. Also, according to an embodiment, the safety distance may vary depending on a type of a road. For example, a safety distance on a highway may be defined to be longer than a safety distance on a general road.

According to an embodiment, the first vehicle 10 may share the traveling path with the external vehicle through the communicator 130. For example, the first vehicle 10 may broadcast information about a first traveling path of the first vehicle 10 planned by the processor 120 through the communicator 130. Also, the processor 120 of the first vehicle 10 may obtain information about a traveling path planned by the external vehicle through the communicator 130. For example, the communicator 130 may obtain a second traveling path planned by the second vehicle 21, a third traveling path planned by the third vehicle 22, and a fourth traveling path planned by the fourth vehicle 23.

According to an embodiment, the processor 120 of the first vehicle 10 may determine a risk of the traveling path planned by the external vehicle. For example, the processor 120 may determine a risk of each of traveling paths planned by a plurality of external vehicles based on a comparison of the traveling paths collected by the plurality of external vehicles and surrounding environment information. When the risk of each of the traveling paths planned by the plurality of external vehicles is greater than a threshold value, the processor 120 may maintain the traveling path of the first vehicle 10 as the first traveling path. Also, when the risk of the second traveling path planned by the second vehicle 21 is less than the threshold value, the processor 120 may change the traveling path of the first vehicle 10 from the first traveling path to the second traveling path.

According to an embodiment, although not shown in FIG. 1, the device 100 may further include a driver, a storage, an input interface (e.g., including input circuitry), an output interface (e.g., including output circuitry), and the like, but is not limited thereto. The detailed configuration of the device 100 will be described in greater detail below with reference to FIG. 21.

Although not shown in FIG. 1, the traveling path planning system may further include a server in addition to the device 100. In this case, according to an embodiment, the device 100 may transmit information (e.g., surrounding image information, current position information, etc.) collected through the sensing unit 110 to the server, and the server may plan the traveling path of the first vehicle 10 based, for example, and without limitation, on a type of at least one external vehicle existing around the first vehicle 10. The device 100 may receive a result of the traveling path planned by the first vehicle 10 from the server and control the first vehicle 10 or display information for guiding the traveling path of the first vehicle 10.

According to an embodiment, the device 100 may determine a stability of a front/rear travelable region in real time in consideration of the type of the at least one vehicle existing around the first vehicle 10 and induce the first vehicle 10 to a region where the stability is enhanced. Hereinafter, a method performed by the device 100 of planning the traveling path of the first vehicle 10 in consideration of the type of the at least one external vehicle will be described in greater detail below with reference to FIG. 2.

Figure 2:
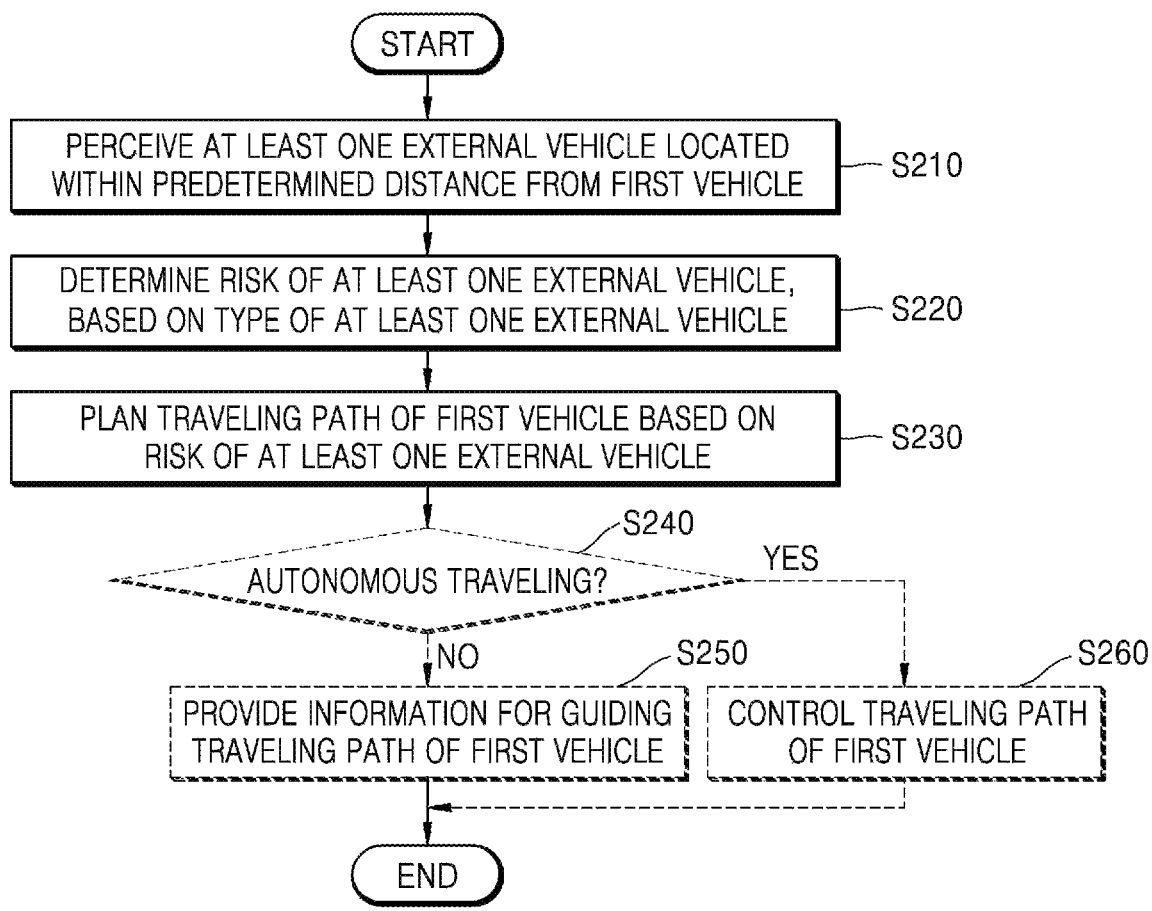
FIG. 2 is a flowchart illustrating an example method of planning a traveling path of a first vehicle, according to an embodiment.

FIG. 2 is a flowchart illustrating an example method of planning a traveling path of the first vehicle 10 according to an embodiment.

In operation S210, the device 100 may perceive (detect) at least one external vehicle located within a predetermined distance from the first vehicle 10.

According to an embodiment, the predetermined distance may, for example, be a range that may be perceived by at least one sensor mounted on the first vehicle 10 or a short range communication radius of the first vehicle 10, but is not limited thereto. For example, the predetermined distance may be a predefined distance by a user or a traveling path planning system.

According to an embodiment, the device 100 may use at least one sensor to perceive, for example, and without limitation, a presence of the at least one external vehicle located within the predetermined distance, a type of the at least one external vehicle, a position of the at least one external vehicle (e.g., a relative position from the first vehicle 10 to the at least one external vehicle, a relative distance from the first vehicle 10 to the at least one external vehicle, etc.), a traveling speed of the at least one external vehicle, or the like.

The at least one external vehicle may include, for example, and without limitation, at least one of a sports car, a truck, a lorry, a bus, a sedan, a coupe, a convertible, an SUV, a van, a compact car, a motorcycle, a bicycle, or the like, but is not limited thereto.

The at least one external vehicle may also include a vehicle traveling at the rear of the same lane as a traveling lane of the first vehicle 10, a vehicle traveling at the rear of a second lane adjacent to a first lane that is the traveling lane of the first vehicle 10, a vehicle traveling in front of the same lane as the traveling lane of the first vehicle 10, a vehicle turning right at an intersection and joining to an adjacent lane of the lane in which the first vehicle 10 is traveling, a vehicle traveling on a third lane adjacent to the second lane adjacent to the first lane that is the traveling lane of the first vehicle 10, but is not limited thereto.

According to an embodiment, the device 100 may analyze an image of the at least one external vehicle obtained through an image sensor to determine a type of the at least one external vehicle. The device 100 may determine the type of the at least one external vehicle based, for example, and without limitation, on a size, a weight, a performance, or the like, of the at least one external vehicle.

For example, the device 100 may detect an outline of the external vehicle included in the image captured through the image sensor. The device 100 may detect, for example, and without limitation, a type of the external vehicle, a name of the external vehicle, and the like, by comparing the detected outline of the external vehicle with a predefined template. For example, the device 100 may perceive the external vehicle as a bus when the outline of the external vehicle is similar to a template of a bus. Also, since the bus is large in size and heavy in weight, the device 100 may determine that the type of the external vehicle is a large vehicle.

When the outline of the external vehicle included in the image captured through the image sensor is similar to a template of a sports car, the device 100 may perceive the external vehicle as the sports car. Since the sports car is good in braking force, the device 100 may determine that the type of the external vehicle is a high performance vehicle.

According to an embodiment, the device 100 may determine the type of the external vehicle using a sign of a vehicle manufacturer (e.g., an emblem or a logo of the vehicle manufacturer, etc.) included in the image of the external vehicle. For example, when an emblem included in the image of the external vehicle corresponds to an emblem of a manufacturer that manufactures an expensive foreign vehicle, the device 100 may determine that the type of the external vehicle is an expensive vehicle.

According to an embodiment, the device 100 may obtain surrounding situation information (context information) with respect to the at least one external vehicle using a precision map. For example, the device 100 may call a precision map around the first vehicle 10. The device 100 may compare sensor information (for example, front camera image information, rear camera image information, side camera image information, radar information, lidar information, ultrasound information, infrared information, etc.) collected in real time when the first vehicle 10 is traveling with the called precision map to obtain a current position (e.g., an absolute position) of the at least one external vehicle, a traveling lane (e.g. a first lane) in which the at least one external vehicle is currently traveling, and information about a surrounding environment (e.g., a stop line, a road mark, a road structure, a vehicle flow condition, etc.) of the at least one external vehicle, but is not limited thereto. The precision map may include not only road information necessary for the vehicle to travel but also a map which is much more precise than an existing map and has an error of, for example, 10-20 cm or less from an actual road.

The device 100 may obtain surrounding environment information of the first vehicle 10 using the at least one sensor and/or the precise map. For example, the device 100 may obtain lanes, stop lines, road mark information, and the like using a front camera or an around view camera. Also, the device 100 may obtain information about road structures using a lidar sensor or a radar sensor. Also, the device 100 may perceive a current traveling lane of the first vehicle 10 using the precision map.

According to an embodiment, the device 100 may perceive the at least one external vehicle using V2X technology (e.g., dedicated short-range communications (DSRC) and/or wireless access in vehicular environments (WAVE)). For example, the device 100 may receive a packet broadcasted or advertised at a predetermined time period by the at least one external vehicle, analyze the received packet and determine a relative position of the at least one external vehicle or a type of the at least one external vehicle. The packet broadcasted or advertised by the at least one external vehicle may include identification information (e.g., a vehicle name, a vehicle type, a manufacturer, etc.) of the at least one external vehicle, position information, etc., but is not limited thereto.

In operation S220, the device 100 may determine a risk of the at least one external vehicle, based on the type of the at least one external vehicle.

According to an embodiment, the risk of the at least one external vehicle may refer, for example, to an index of a possibility that the at least one external vehicle that is traveling has a negative impact on the first vehicle 10. The risk of the at least one external vehicle may be defined differently based on the type of the at least one external vehicle.

Figure 3:
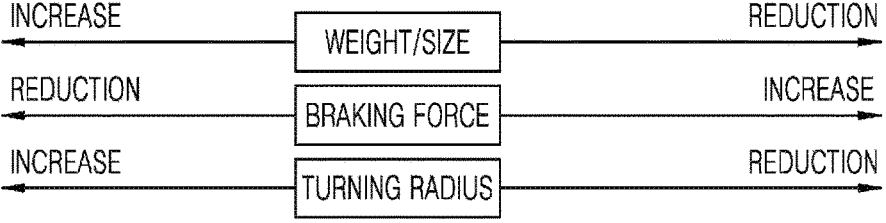
FIG. 3 is a diagram illustrating example risk based on a type of an external vehicle, according to an embodiment

For example, referring to FIG. 3, the device 100 may, for example, and without limitation, classify a type 310 of a vehicle into a large-size vehicle 301, an SUV 302, a midsize vehicle 303, and a small-size vehicle 304. As a feature 320 based on the type 310 of the vehicle, a weight and a size may increase from the small-size vehicle 304 to the large-size vehicle 301, and a braking force may decrease from the small-size vehicle 304 to the large-size vehicle 301, and a turning radius may increase from the small-size vehicle 304 to the large-size vehicle 301.

The device 100 may define a risk 330 based on the feature 320 based on the type 310 of the vehicle. For example, the device 100 may define a risk of the large-size vehicle 301 as 2.0, a risk of the SUV 302 as 1.5, a risk of the midsize vehicle 303 as 1.0, and a risk of the small-size vehicle 304 as 0.7. The device 100 may then classify (340) the external vehicle into a high-risk vehicle, a middle-risk vehicle, or a low-risk vehicle based on the risk 330 of the external vehicle. For example, the device 100 may classify the large-size vehicle 301 having the risk greater than 1.5 as the high-risk vehicle, the SUV 302 having the risk greater than 1.0 and less than 1.5 as the middle risk vehicle, and the midsize vehicle 303 and the small-size vehicle 304 having the risk less than or equal to 1.0 as the low-risk vehicles.

Since necessary braking distances are different for each vehicle, the device 100 may differentially provide a safety distance 350 based on the type 310 of the external vehicle. For example, in the case where a speed of the external vehicle is an average traveling speed, when the external vehicle is the large-size vehicle 301, the device 100 may provide the safety distance 350 that is longer than that when the external vehicle is a midsize/small-size vehicle. For example, when the external vehicle is the midsize vehicle 303 traveling at 70 km/h, the device 100 may define the safety distance 350 of the midsize vehicle 303 as 70 m, and when the external vehicle is the large-size vehicle 301 traveling at 70 km/h, may define the safety distance 350 of the large-size vehicle 301 as 100 m.

The type of vehicle 310, the risk 330, and the classification 340 are not limited to a table shown in FIG. 3, and may be variously changed. For example, the device 100 may easily classify the type 310 of the vehicle into the large-size vehicle 301 and midsize and small-size vehicles. The device 100 may also classify the type 310 of the vehicle into the large-size vehicle 301, the SUV 302, a sports car, a sedan, and a compact vehicle in detail. Also, the device 100 may classify only the large-size vehicle 301 as the high-risk vehicle and classify the SUV 302, the midsize vehicle 303, and the small-size vehicle 304 as the low-risk vehicles.

In operation S230, the device 100 may plan a traveling path of the first vehicle 10 based on the risk of the at least one external vehicle.

For example, based on a risk of an external vehicle located around the first vehicle 10, the device 100 may plan the traveling path of the first vehicle 10 to change a path of the first vehicle 10, change lanes of the first vehicle 10, adjust a traveling speed (for example, accelerating or decelerating) of the first vehicle 10, stop or end traveling of the first vehicle 10, maintain a current state of the first vehicle 10, or the like, but is not limited thereto.

Besides the risk of the at least one external vehicle, the device 100 may plan the traveling path of the first vehicle 10 in further consideration of, for example, and without limitation, a traveling lane of the at least one external vehicle, a traveling speed of the at least one external vehicle, a distance between the first vehicle 10 and the at least one external vehicle, or a turning radius of the at least one external vehicle, or the like.

According to an embodiment, the device 100 may perceive a high-risk second traveling at the rear of the same lane as the traveling lane of the first vehicle 10. When a distance between the second vehicle and the first vehicle 10 is less than a safety distance (for example, 100 m) previously defined according to a risk of the second vehicle, the device 100 may determine the traveling path of the first vehicle 10 such that the traveling lane of the first vehicle 10 is changed. The device 100 may determine the traveling path of the first vehicle 10 such that the traveling speed of the first vehicle 10 increases and the distance between the second vehicle and the first vehicle 10 is greater than the safety distance (for example, 100 m) previously defined according to the risk of the second vehicle. A method performed by the device 100 of planning the traveling path of the first vehicle 10 according to the risk of the second vehicle will be described later in greater detail below with reference to FIG. 4.

According to an embodiment, the device 100 may perceive a third vehicle traveling at the rear of a second lane adjacent to a first lane which is the traveling lane of the first vehicle 10. At this time, the device 100 may determine whether to change the traveling lane of the first vehicle 10 from the first lane to the second lane based on a type of the third vehicle and a distance between the first vehicle 10 and the third vehicle. For example, when the third vehicle is the low-risk vehicle, the device 100 may determine that the traveling lane of the first vehicle 10 is changed from the first lane to the second lane when the distance between the first vehicle 10 and the third vehicle is greater than a first safety distance (e.g., 70 m). When the third vehicle is the high-risk vehicle, then the device 100 may determine that the traveling lane of the first vehicle 10 is changed from the first lane to the second lane when the distance between the first vehicle 10 and the third vehicle is greater than a second safety distance (e.g., 100 m). The second safety distance may be longer than the first safety distance. For example, as a risk of the third vehicle increases, the safety distance between the first vehicle 10 and the third vehicle may become longer. A method performed by the device 100 of determining whether to change the traveling lane of the first vehicle 10 based on the risk of the third vehicle will be described in greater detail below with reference to FIG. 8.

According to an embodiment, the device 100 may perceive a fourth vehicle traveling in front of the same lane as the traveling lane of the first vehicle 10. At this time, when a distance between the first vehicle 10 and the fourth vehicle is less than a predefined safety distance according to a risk of the fourth vehicle, the device 100 may determine that a traveling speed of the first vehicle 10 is reduced. For example, when the risk of the fourth vehicle traveling ahead is 2.0, the safety distance of the first vehicle 10 may be defined as '100 m', and when the risk of the fourth vehicle traveling ahead is 1.0, the safety distance of the first vehicle 10 may be defined as '50 m'. When the risk of the fourth vehicle is 2.0 and the distance between the first vehicle 10 and the fourth vehicle is 70 m, the device 100 may plan a traveling path that reduces the speed of the first vehicle 10 such that the distance between the first vehicle 10 and the fourth vehicle is greater than 100 m. An operation of planning the traveling path of the first vehicle 10 according to the risk of the fourth vehicle traveling ahead will be described in greater detail below with reference to FIG. 10.

According to an embodiment, when the device 100 is to change the traveling lane of the first vehicle 10 from the first lane to the second lane, the device 100 may perceive an external vehicle traveling in a third lane adjacent to the second lane. The device 100 may predict a lane change speed or a lane change probability of the external vehicle based on a type of the external vehicle traveling in the third lane. The device 100 may determine whether to change the traveling lane of the first vehicle 10 from the first lane to the second lane based on the predicted lane change speed or lane change probability of the external vehicle. A method of determining whether the device 100 changes the traveling lane of the first vehicle 10 according to the lane change speed or the lane change probability of the external vehicle will be described in greater detail below with reference to FIG. 16.

According to an embodiment, the device 100 may determine a lane for stopping the first vehicle 10 based on a risk of a fifth vehicle traveling in the rear of the same lane as the traveling lane of the first vehicle 10 and a risk of at least one sixth vehicle traveling in the rear of a lane different from the traveling lane of the first vehicle 10.

For example, when the risk of the fifth vehicle is less than or equal to the risk of the at least one sixth vehicle, the device 100 may determine to stop the first vehicle 10 in a current traveling lane. When the risk of the fifth vehicle is greater than the risk of the at least one sixth vehicle, the device 100 may determine to stop the first vehicle 10 in a different lane from the current traveling lane. A method performed by the device 100 of determining the lane for stopping the first vehicle 10 according to risks of external vehicles traveling in the rear of the first vehicle 10 will be described in greater detail below with reference to FIG. 12.

According to an embodiment, the device 100 may perceive a seventh vehicle that turns right at a front intersection of the first vehicle 10 and joins an adjacent lane of the lane in which the first vehicle 10 is traveling. The device 100 may determine an intersection turning radius of the seventh vehicle, and determine whether to decelerate the traveling speed of the first vehicle 10 or change the lane of the first vehicle 10 based on the intersection turning radius of the seventh vehicle. A method performed by the device 100 of planning the traveling path of the first vehicle 10 based on the intersection turning radius of the seventh vehicle will be described in greater detail below with reference to FIG. 14.

According to an embodiment, the device 100 may predict a blind spot of a driver who drives at least one external vehicle traveling in a lane different from the traveling lane of the first vehicle 10 based on a type of the at least one external vehicle. The device 100 may determine the traveling speed of the first vehicle 10 based on the predicted blind spot. For example, the device 100 may plan a traveling path that decelerates or accelerates the speed of the first vehicle 10 or that maintains a current speed to avoid the blind spot. Also, the device 100 may plan the traveling path that changes the lane of the first vehicle 10 to avoid the blind spot. A method performed by the device 100 of planning the traveling path of the first vehicle 10 to avoid the blind spot of the driver of the at least one external vehicle will be described in greater detail below with reference to FIG. 18.

In operation S240, the device 100 may determine whether the first vehicle 10 is in an autonomous traveling mode when the planned traveling path is not a traveling path that maintains the current state in operation S230.

In operation S250, when the first vehicle 10 is not in the autonomous traveling mode, the device 100 may provide information for guiding the traveling path of the first vehicle 10 for the driver.

According to an embodiment, the device 100 may provide the information for guiding the traveling path of the first vehicle 10 as, for example, and without limitation, at least one of a visual signal, an audio signal, a tactile signal (e.g., a vibration signal), or the like. For example, the device 100 may display an indication (image or text) on a display that induces a lane change of the first vehicle 10 or induces a speed adjustment. The device 100 may output a voice that induces the lane change of the first vehicle 10 or induces the speed adjustment. The device 100 may output a vibration signal until the traveling path of the first vehicle 10 is changed to the planned traveling path.

In operation S260, when the first vehicle 10 is in the autonomous traveling mode, the device 100 may control the traveling path of the first vehicle 10 according to the planned traveling path. For example, and without limitation, the device 100 may automatically change the lane of the first vehicle 10, adjust the speed of the first vehicle 10, stop the first vehicle 10, or the like, but is not limited thereto.

When the planned traveling path is the traveling path in which the current state is maintained in operation S230, operations S240 to S260 may be omitted. Hereinafter, an operation of the device 100 for planning the traveling path of the first vehicle 10 based on the risk of the external vehicle will be described in greater detail.

Figure 4:
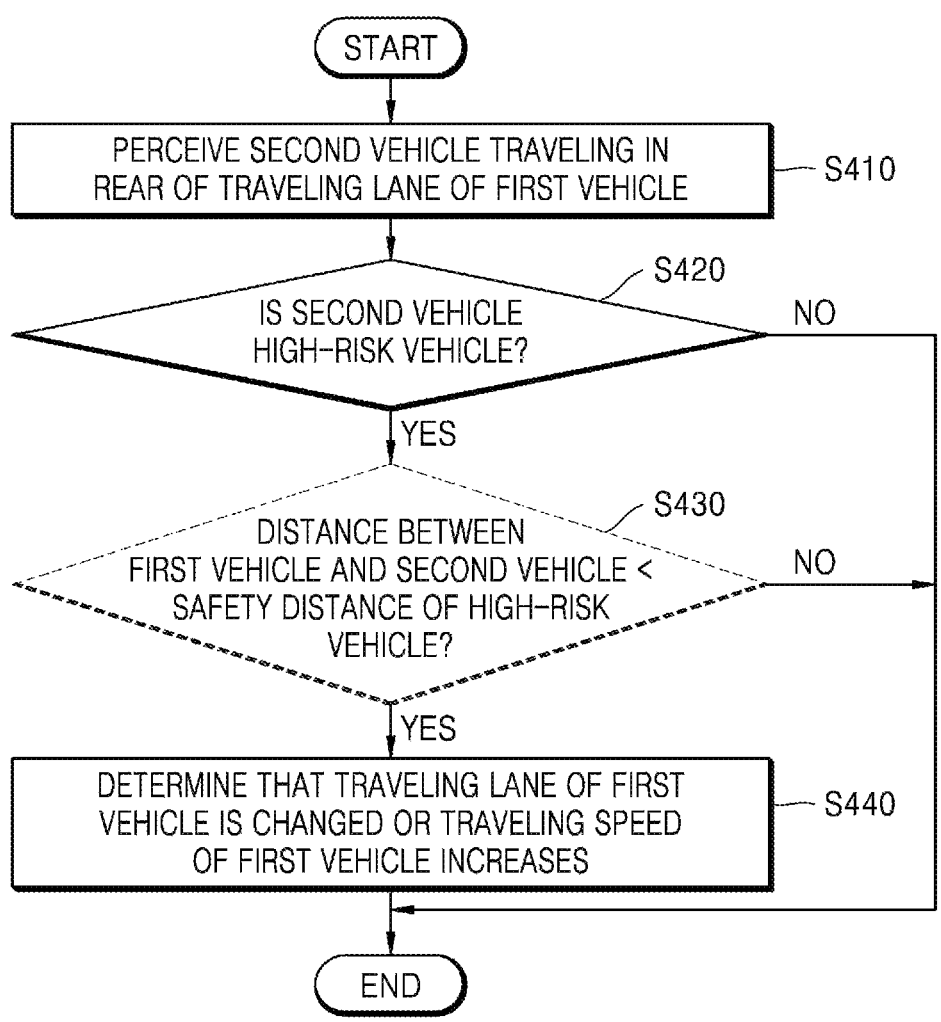
FIG. 4 is a flowchart illustrating an example method of planning a traveling path of a first vehicle according to a type of a rear vehicle, according to an embodiment.

FIG. 4 is a flowchart illustrating an example method of planning a traveling path of the first vehicle 10 according to a type of a rear vehicle according to an embodiment.

In operation S410, the device 100 may perceive a second vehicle traveling in the rear of a traveling lane of the first vehicle 10.

According to an embodiment, the device 100 may, for example, perceive the second vehicle using at least one sensor mounted on the first vehicle 10 and/or a precision map. For example, the device 100 may perceive a presence of the second vehicle and a type of the second vehicle using, for example, and without limitation, an image sensor, a radar sensor, a lidar sensor, or the like. Also, the device 100 may analyze a series of frames obtained via the image sensor to determine a speed of the second vehicle, a position of the second vehicle (e.g., a traveling lane of the second vehicle, etc.). The device 100 may determine a relative distance between the first vehicle 10 and the second vehicle using a distance sensor mounted on the first vehicle 10. The device 100 may also perceive a current position of the first vehicle 10 using, for example, and without limitation, a position sensor (e.g., GPS), or the like, and may use, for example, and without limitation, an inertial sensor, a geomagnetism sensor, an acceleration sensor, a gyroscope sensor, or the like, to perceive a current speed and/or a traveling direction of the first vehicle 10.

According to an embodiment, the device 100 may perceive a current traveling lane of the first vehicle 10, a current traveling lane of the second vehicle, a stop line, a road condition, a road structure mark, or the like, using the precision map.

The device 100 may use sensing information collected from sensors mounted on the first vehicle 10 and/or the precision map to perceive that the second vehicle is behind the first vehicle 10, the second vehicle is traveling in the same lane as the traveling lane of the first vehicle 10 and the type of the second vehicle, but is not limited thereto.

In operation S420, the device 100 may determine, based on the type of the second vehicle, whether the second vehicle is a high-risk vehicle.

According to an embodiment, the device 100 may determine a risk of the second vehicle based on the type of the second vehicle, and when the risk of the second vehicle is greater than a threshold value (for example, 1.5), may determine that the second vehicle is the high-risk vehicle. The device 100 may determine that the second vehicle is a low-risk vehicle when the risk of the second vehicle is less than or equal to the threshold value (e.g., 1.5). For example, when the second vehicle is a bus and a risk of the bus is 2.0 that is greater than the threshold value (e.g., 1.5), the device 100 may determine that the second vehicle is the high-risk vehicle.

In operation S430, the device 100 may determine whether a distance between the first vehicle 10 and the second vehicle is less than a safety distance of the high-risk vehicle when the second vehicle is the high-risk vehicle. For example, when the safety distance of the high-risk vehicle on a highway is predefined as 100 m, the device 100 may determine whether the distance between the first vehicle 10 and the second vehicle is less than 100 m.

In operation S440, the device 100 may determine that a traveling lane of the first vehicle 10 is changed or a traveling speed of the first vehicle 10 increases when the distance between the first vehicle 10 and the second vehicle is less than the safety distance of the high-risk vehicle. When the second vehicle is the high-risk vehicle such as the bus, a braking force of the second vehicle may not be good. For example, when the second vehicle may not brake in time, the first vehicle may suffer great damage. The device 100 may determine that the traveling lane of the first vehicle 10 is changed or the traveling speed of the first vehicle 10 increases, thereby avoiding the risk from the second vehicle.

According to an embodiment, when the distance between the first vehicle 10 and the second vehicle is less than the safety distance of the high risk vehicle, the device 100 may determine that the traveling speed of the first vehicle 10 increases. However, in a situation where it is difficult to increase the traveling speed of the first vehicle 10, the device 100 may determine that the traveling lane of the first vehicle 10 is changed. For example, when a distance between the first vehicle 10 and an external vehicle traveling in front of the first vehicle 10 is not suitable for increasing the traveling speed of the first vehicle 10 or when a stop line is present in front of the first vehicle 10, the device 100 may determine that the traveling lane of the first vehicle 10 is changed without increasing the traveling speed of the first vehicle 10.

According to an embodiment, when the device 100 determines that the traveling lane of the first vehicle 10 is changed, the device 100 may determine the lane to a region in which a stability is improved, in consideration of speed or positions of externals vehicles traveling in other lanes. For example, when the first vehicle 10 is traveling in a second lane, the device 100 may perceive a bus approaching from the rear of the second lane. When no other vehicle is traveling in a first lane, and a truck is traveling in the rear of a third lane, the device 100 may determine that the lane of the first vehicle 10 is changed to the third lane rather than the first lane.

According to an embodiment, operation S430 may be omitted. For example, when the second vehicle traveling in the rear is the high-risk vehicle, the device 100 may determine that the traveling lane of the first vehicle 10 is changed regardless of the distance between the first vehicle 10 and the second vehicle or the traveling speed of the first vehicle 10 increases.

Figure 5:
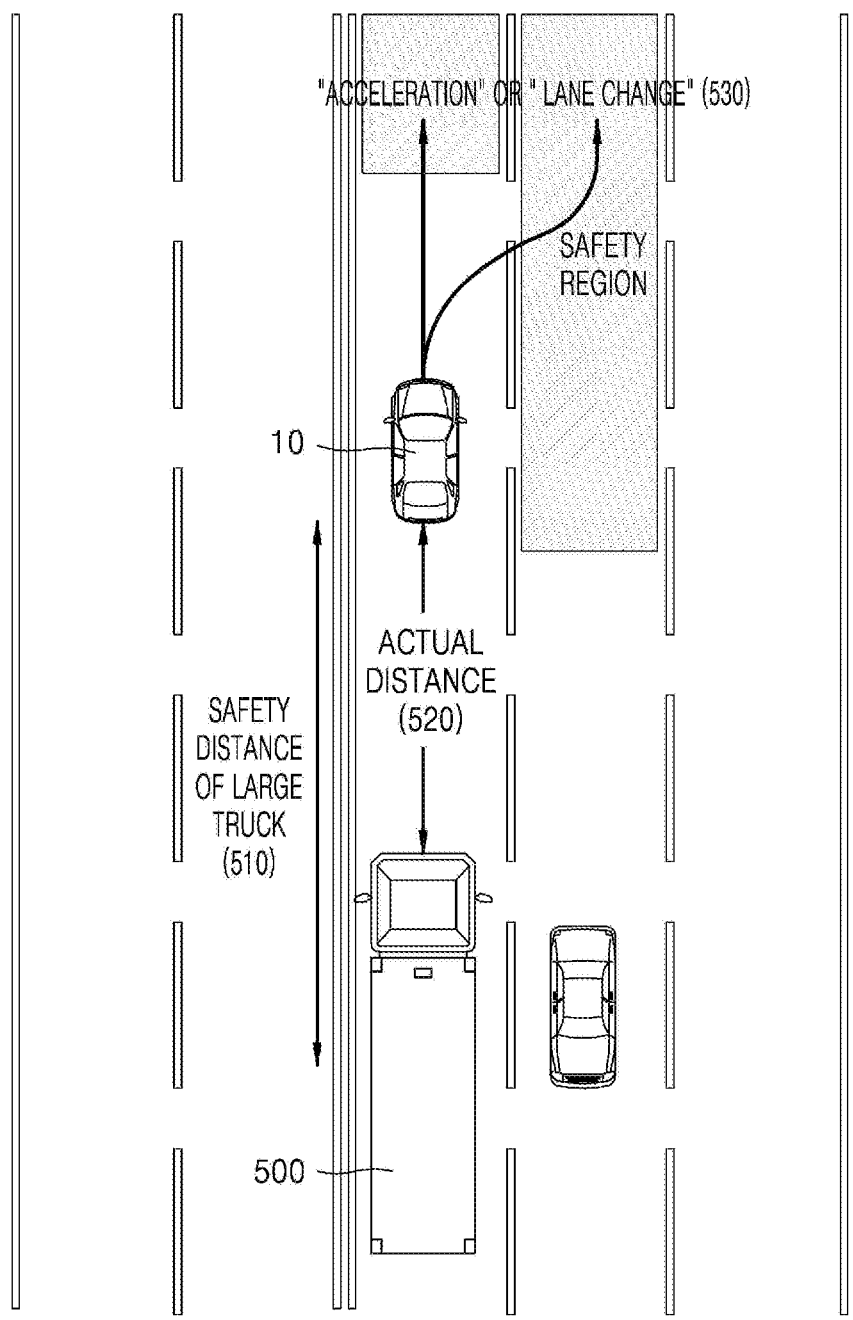
FIG. 5 is a diagram illustrating an example operation of planning a traveling path of a first vehicle, in consideration of a safety distance of a large truck perceived in the rear, according to an embodiment.

With reference to FIG. 5, the operation of the device 100 for planning the traveling path of the first vehicle 10 when a large truck 500 is perceived from the rear will be described in greater detail.

FIG. 5 is a diagram illustrating an example operation of planning a traveling path of the first vehicle 10, in consideration of a safety distance of a large truck perceived in the rear according to an embodiment.

Referring to FIG. 5, the first vehicle 10 may be traveling in a first lane on a highway. The device 100 may perceive the large truck 500 traveling in the rear of the first vehicle 10 using, for example, at least one sensor. The large truck 500 may be classified as a high-risk vehicle and a safety distance 510 of the large truck 500 on the highway may be defined, for example, as 100 m.

The device 100 may determine an actual distance 520 between the first vehicle 10 and the large truck 500 using, for example, the at least one sensor. When the actual distance 520 is less than the safety distance 510 of the large truck 500, since a probability that the first vehicle 10 is in a dangerous situation increases, the device 100 may determine that a traveling speed of the first vehicle 10 increases or a lane is changed (530). For example, when no vehicle travels in front of the first vehicle 10 in the first lane or a vehicle travels in front of the first vehicle 10 more than a predetermined distance (for example, a safety distance of the first vehicle 10), the device 100 may determine that the traveling speed of the first vehicle 10 increases. The actual distance 520 between the first vehicle 10 and the large truck 500 may be greater than the safety distance 510 of the large truck 500 when the traveling speed of the first vehicle 10 increases.

When a vehicle travels in front of the first vehicle 10 within the predetermined distance (for example, the safety distance of the first vehicle 10), the device 100 may determine that a traveling lane of the first vehicle 10 is changed from a first lane to a second lane 530.

According to an embodiment, when the device 100 perceives a high-risk vehicle (e.g., the large truck 500) traveling in the rear of the first vehicle 10 in the same lane as the first vehicle 10, the device 100 may appropriately plan a traveling path of the first vehicle 10, thereby improving a traveling stability of the first vehicle 10.

Figure 6:
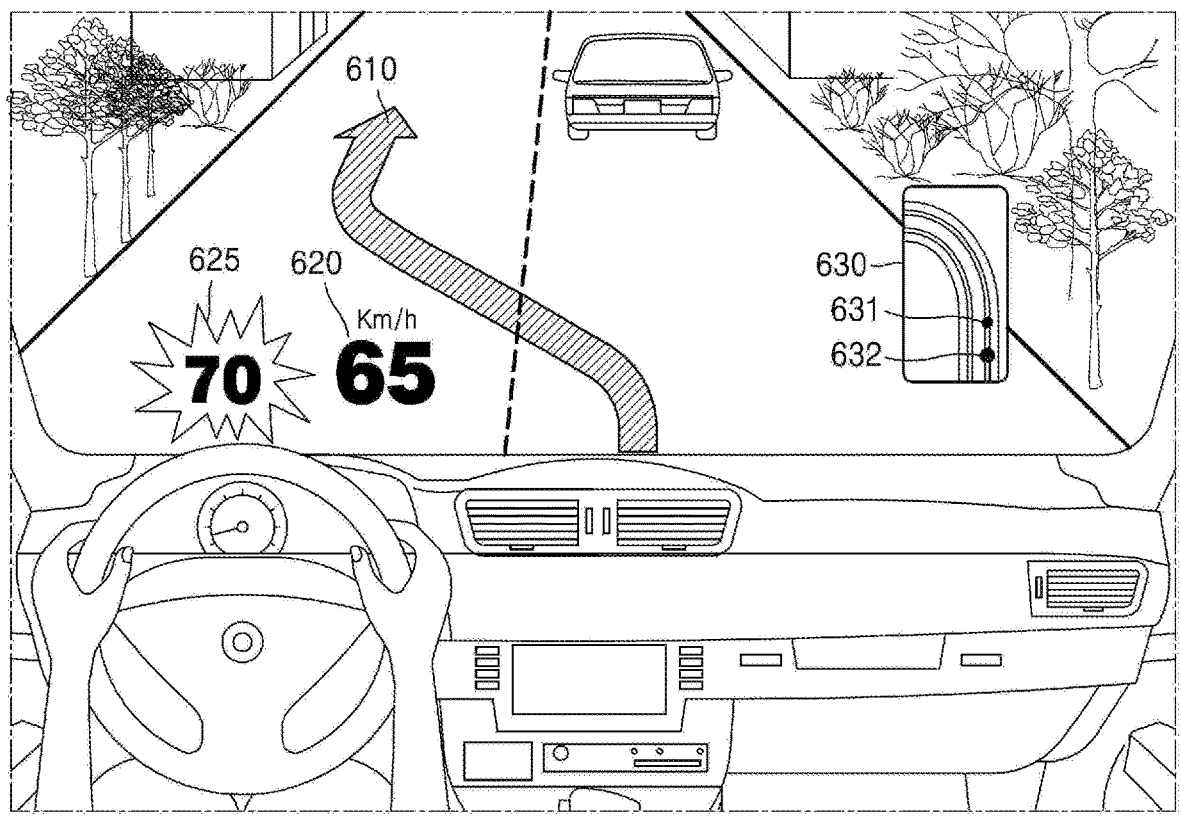
FIG. 6 is a diagram illustrating an example operation of visually providing information for guiding a motion of a first vehicle, according to an embodiment.

FIG. 6 is a diagram illustrating an example operation of visually providing information for guiding a traveling path of the first vehicle 10 according to an embodiment.

Referring to FIG. 6, the device 100 may visually display the information for guiding the traveling path of the first vehicle 10. According to an embodiment, the device 100 display the information for guiding the traveling path of the first vehicle 10 on, for example, and without limitation, at least one of to a display mounted on the first vehicle 10, a navigation device, a mobile device connected to the first vehicle 10, or the like.

According to an embodiment, the device 100 may display the information for guiding the traveling path of the first vehicle 10 on a transparent display. The transparent display may be implemented as a projection type display as well as, for example, and without limitation, a transparent liquid crystal display (LCD), a transparent thin-film electroluminescent panel (TFEL), a transparent OLED, or the like. The projection type display may refer, for example, to a method of projecting and displaying an image on a transparent screen such as a head up display (HUD).

According to an embodiment, the device 100 may display the information for guiding the traveling path of the first vehicle 10 in augmented reality (AR). AR may refer, for example, to a technology of overlapping the real world that a user sees with virtual objects.

For example, when the device 100 perceives the large truck 500 traveling in the same lane (for example, a second lane) as the first vehicle 10 in the rear of the first vehicle 10, the device 100 may change a traveling lane of the first vehicle 10 from the second lane to a first lane. The device 100 may display an arrow 610 to induce a lane change.

According to an embodiment, the device 100 may display on the display a map 630 that represents the traveling path of the first vehicle 10. The device 100 may also display a position 631 of the first vehicle 10 and a position 632 of the large truck 500 on the map 630.

According to an embodiment, the device 100 may display an indication that induces an increase in a traveling speed of the first vehicle 10. For example, the device 100 may induce a driver to induce the increase in the traveling speed of the first vehicle 10 by displaying a current speed 620 (e.g., 65 km/h) and a recommended speed 625 (e.g., 70 km/h) of the first vehicle 10.

When the first vehicle 10 is an autonomous vehicle, the device 100 may not visually display the information for guiding the traveling path of the first vehicle 10 on the display.

Figure 7:
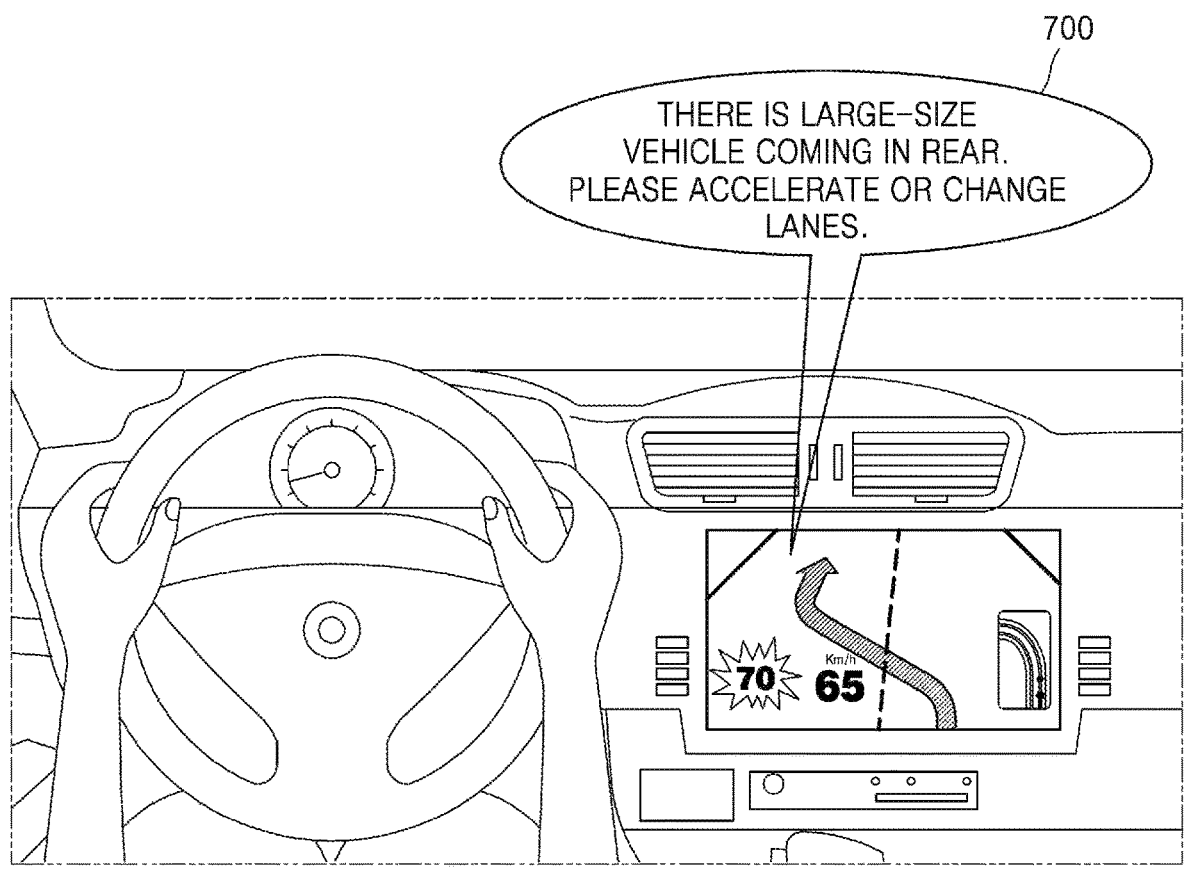
FIG. 7 is a diagram illustrating an example operation of providing information for maneuvering a first vehicle using a voice signal, according to an embodiment.

FIG. 7 is a diagram illustrating an example operation of providing information for maneuvering the first vehicle 10 as a voice signal according to an embodiment.

Referring to FIG. 7, when the device 100 perceives the large truck 500 traveling in the same lane (for example, a second lane) as the first vehicle 10 in the rear of the first vehicle 10, the device 100 may output the voice signal to guide a driver to change the traveling lane of the first vehicle 10 or accelerate a traveling speed of the first vehicle 10. For example, the device 100 may induce the driver to change the traveling lane of the first vehicle 10 or accelerate the traveling speed of the first vehicle 10 by outputting a voice message 700 "There is a large-size vehicle coming in the rear. Please accelerate or change lanes".

Figure 8:
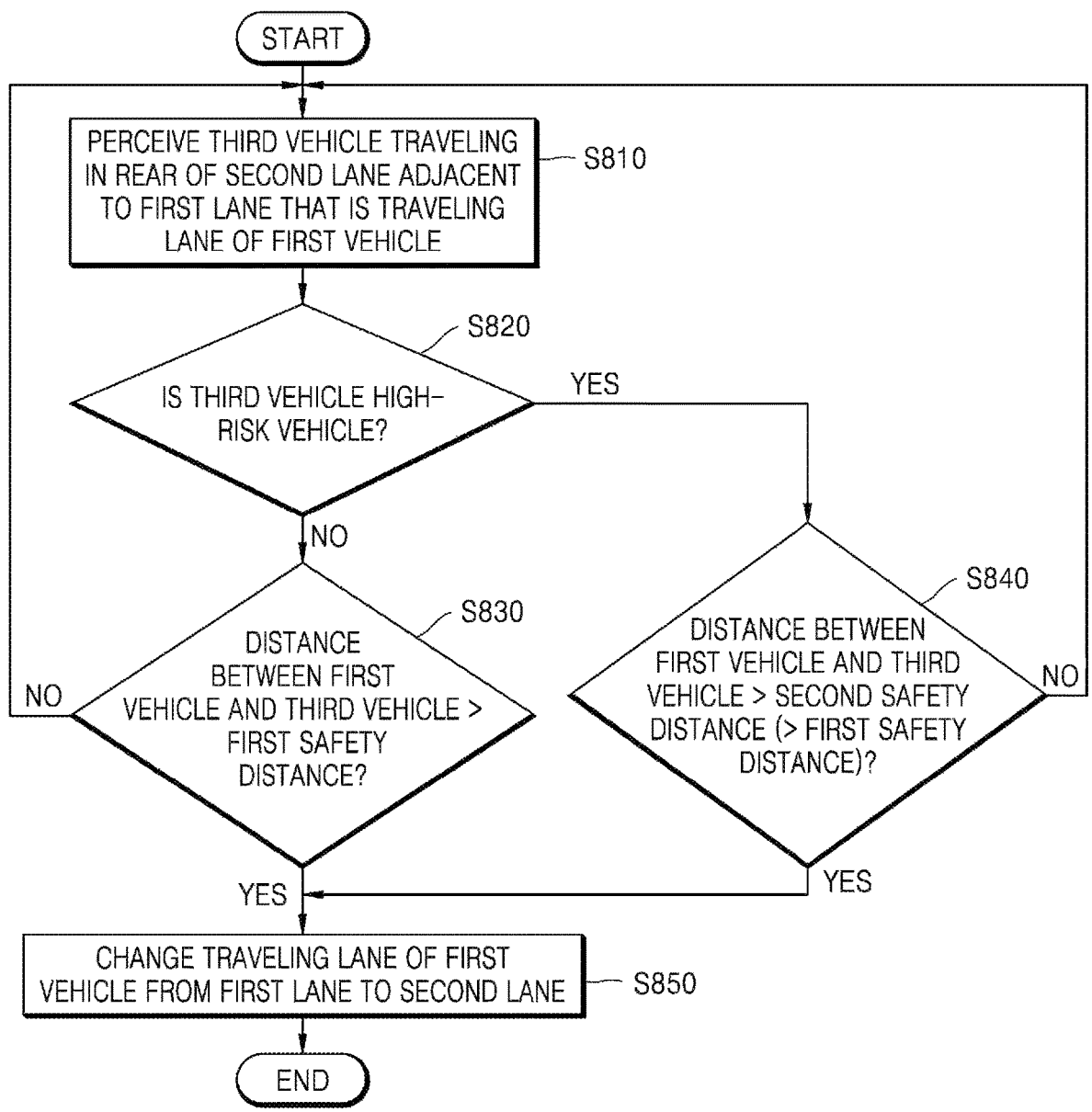
FIG. 8 is a flowchart illustrating an example method of determining a lane change of a first vehicle based on a type of a nearby vehicle, according to an embodiment.

FIG. 8 is a flowchart illustrating an example method of determining a lane change of the first vehicle 10 based on a type of a surrounding vehicle according to an embodiment.

In operation S810, the device 100 may perceive a third vehicle traveling in the rear of a second lane adjacent to a first lane that is a traveling lane of the first vehicle 10.

According to an embodiment, the device 100 may perceive the third vehicle using, for example, and without limitation, at least one sensor mounted on the first vehicle 10 and/or a precision map. For example, the device 100 may perceive a presence of the third vehicle and a type of the third vehicle using, for example, and without limitation an image sensor, a radar sensor, a lidar sensor, or the like. The device 100 may also analyze a series of frames obtained through the image sensor to determine a speed of the third vehicle or a position of the third vehicle (e.g., a traveling lane of the third vehicle, etc.). The device 100 may also determine a relative distance between the first vehicle 10 and the third vehicle using a distance sensor mounted on the first vehicle 10. The device 100 may also perceive a current position of the first vehicle 10 using a position sensor (e.g., a GPS) and may use an inertia sensor, a geomagnetism sensor, an acceleration sensor, or a gyroscope sensor or the like to perceive a current speed/traveling direction of the first vehicle 10.

According to an embodiment, the device 100 may perceive a current traveling lane of the first vehicle 10, a current traveling lane of the third vehicle, a stop line, a road condition, a road structure mark, or the like, using the precision map.

The device 100 may use sensing information collected from sensors mounted on the first vehicle 10 and/or precision map to perceive that the third vehicle is behind the first vehicle 10, the third vehicle is traveling in a second lane adjacent to a first lane that is a traveling lane of the first vehicle 10 and a type of the third vehicle, but is not limited thereto.

In operation S820, the device 100 may determine whether the third vehicle is a high-risk vehicle.

According to an embodiment, the device 100 may determine a risk of the third vehicle based on the type of the third vehicle. The device 100 may then compare the risk of the third vehicle with a threshold value to determine whether the third vehicle is the high-risk vehicle. For example, when the risk of the third vehicle is greater than a threshold value (e.g., 1.5), the device 100 may determine that the third vehicle is the high-risk vehicle. On the other hand, when the risk of the third vehicle is equal to or less than the threshold value (e.g., 1.5), the device 100 may determine that the third vehicle is a low-risk vehicle.

In operations S830 and S850, the device 100 may determine whether a distance between the first vehicle 10 and the third vehicle is longer than a first safety distance, when the third vehicle is not the high-risk vehicle. The first safety distance may be predefined. For example, the first safety distance may be a safety distance of the low-risk vehicle.

According to an embodiment, when the distance between the first vehicle 10 and the third vehicle is longer than the first safety distance, the device 100 may plan a traveling path of the first vehicle 10 to change the traveling lane of the first vehicle 10 from the first lane to the second lane. When the distance between the first vehicle 10 and the third vehicle is equal to or less than the first safety distance, the device 100 may determine that the lane of the first vehicle 10 is not changed and monitor whether the distance between the first vehicle 10 and the third vehicle is longer than the first safety distance. When the distance between the first vehicle 10 and the third vehicle is longer than the first safety distance, the device 100 may plan the traveling path of the first vehicle 10 to change the traveling lane of the first vehicle 10 from the first lane to the second lane.

In operations S840 and S850, the device 100 may determine whether the distance between the first vehicle 10 and the third vehicle is longer than a second safety distance, when the third vehicle is the high-risk vehicle. The second safety distance may be predefined. For example, the second safety distance may be a safety distance of the high-risk vehicle. Thus, the second safety distance (e.g., the safety distance of the high-risk vehicle) may be longer than the first safety distance (e.g., the safety distance of the low-risk vehicle).

According to an embodiment, the device 100 may plan the traveling path of the first vehicle 10 to change the traveling lane of the first vehicle 10 from the first lane to the second lane when the distance between the first vehicle 10 and the third vehicle is longer than the second safety distance. When the distance between the first vehicle 10 and the third vehicle is equal to or less than the second safety distance, the device 100 may determine that the lane of the first vehicle 10 is not changed and monitor whether the distance between the first vehicle 10 and the third vehicle is longer than the second safety distance. When the distance between the first vehicle 10 and the third vehicle is longer than the second safety distance, the device 100 may plan the traveling path of the first vehicle 10 to change the traveling lane of the first vehicle 10 from the first lane to the second lane.

Figure 9:
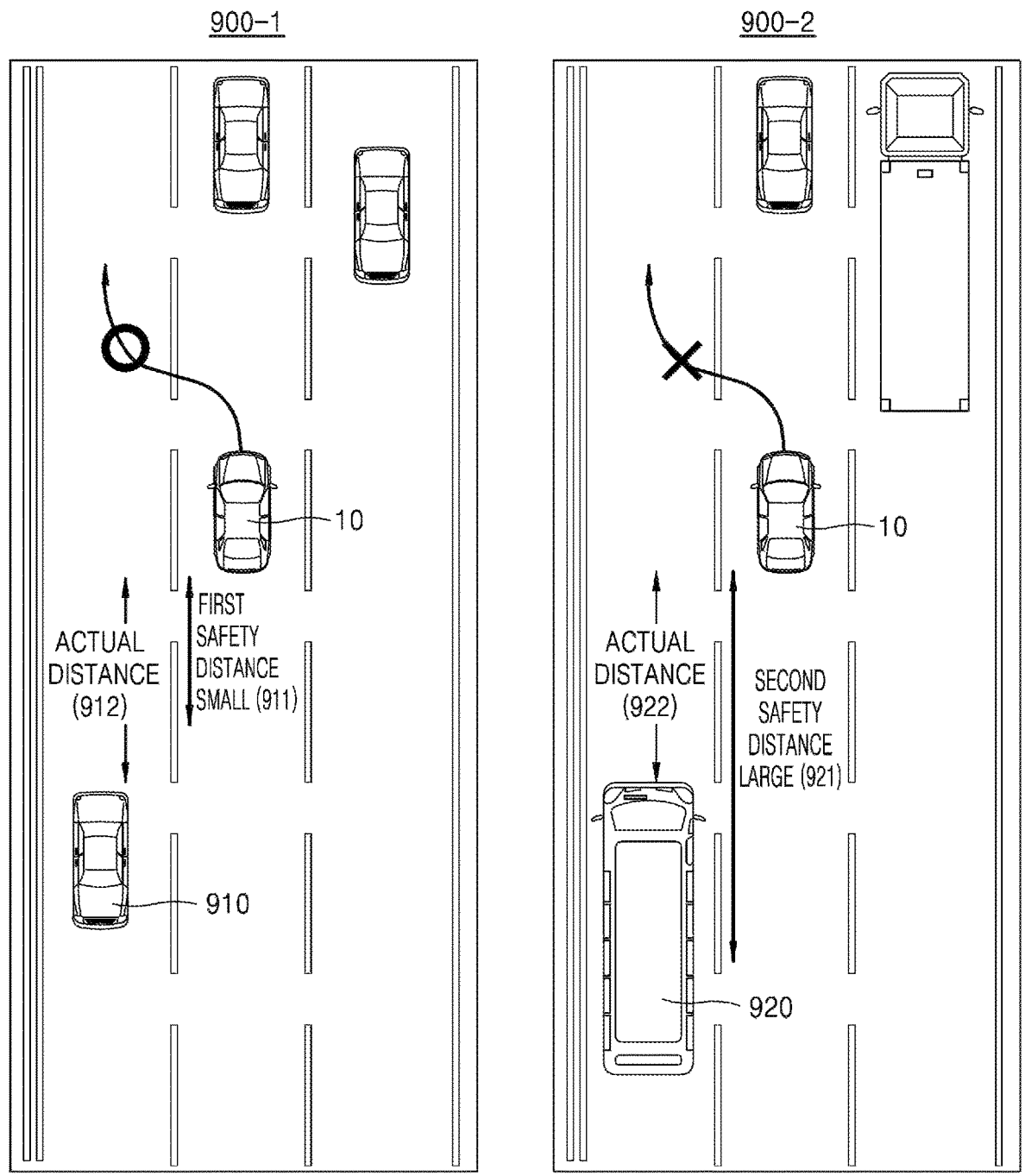
FIG. 9 is a diagram illustrating an example operation for determining whether to change a lane of a first vehicle based on a type of a next lane vehicle, according to an embodiment.

Accordingly, as a risk of an external vehicle traveling in the rear of an adjacent lane becomes higher, the device may allow the first vehicle 10 to attempt the lane change to the adjacent lane with a greater space margin, thereby increasing a stability of the lane change of the first vehicle 10. With reference to FIG. 9, the operation of the device 100 of determining the lane change to an adjacent lane of the first vehicle 10 according to a type of an external vehicle traveling in the adjacent lane will be described in greater detail.

FIG. 9 is a diagram illustrating an example operation for determining whether to change a lane of the first vehicle 10 according to a type of a next lane vehicle according to an embodiment. In FIG. 9, a case where the device 100 changes the lane of the first vehicle 10 traveling a second lane to a first lane will be described as an example.

Referring to 900-1 of FIG. 9, the device 100 may use sensing information collected from at least one sensor mounted on the first vehicle 10 and/or a precision map to perceive a midsize vehicle 910 traveling in the rear of the first vehicle 10 in the first lane. The device 100 may classify the midsize vehicle 910 as a low-risk vehicle since a risk (e.g., 1.0) of the midsize vehicle 910 is equal to or less than a threshold value (e.g., 1.5). The device 100 may then identify a first safety distance 911 which is a safety distance of the low-risk vehicle and compare the first safety distance 911 and an actual distance 912 between the first vehicle 10 and the midsize vehicle 910.

The device 100 may determine that the traveling lane of the first vehicle 10 is changed from the second lane to the first lane when the actual distance 912 is longer than the first safety distance 911. The device 100 may determine that the traveling lane of the first vehicle 10 is not changed from the second lane to the first lane when the actual distance 912 is shorter than the first safety distance 911. For example, when the first safety distance 911 is 50 m and the actual distance 912 is 70 m, since the first vehicle 10 may safely change from the second lane to the first lane, the device 100 may determine the lane change of the first vehicle 10.

Referring to 900-2 of FIG. 9, the device 100 may use the sensing information collected from the at least one sensor mounted on the first vehicle 10 and/or the precision map to perceive a bus 920 traveling in the rear of the first vehicle 10 in the first lane. The device 100 may classify the bus 920 as a high-risk vehicle since a risk (e.g., 2.0) of the bus 920 is greater than the threshold value (e.g., 1.5). The device 100 may then identify a second safety distance 921 which is a safety distance of the high-risk vehicle and compare the second safety distance 921 and an actual distance 922 between the first vehicle 10 and the bus 920.

The device 100 may determine that the traveling lane of the first vehicle 10 is changed from the second lane to the first lane when the actual distance 922 is longer than the second safety distance 921. The device 100 may determine that the traveling lane of the first vehicle 10 is not changed from the second lane to the first lane when the actual distance 922 is shorter than the second safety distance 921. For example, when the second safety distance 921 is 100 m and the actual distance 922 is 70 m, the device 100 may determine that the first vehicle 10 maintains a current traveling lane.

According to an embodiment, the device 100 may determine that the first vehicle 10 accelerates. When the first vehicle 10 accelerates and the actual distance 922 between the first vehicle 10 and the bus 920 is longer than the second safety distance 921, since the first vehicle 10 may safely change from the second lane to the first lane, the device 100 may determine the lane change of the first vehicle 10.

Thus, referring to FIG. 9, when a distance between an external vehicle traveling in the rear of an adjacent lane and the first vehicle 10 is 70 m, the device 100 may determine that the first vehicle 10 maintains the current traveling lane when the external vehicle is the bus 920, and determine that the first vehicle 10 changes the lane when the external vehicle is the midsize vehicle 910. For example, since a braking force of the bus 920 is lower than that of the midsize vehicle 910, when the bus 920 is traveling in the rear of a next lane, the device 100 may allow the first vehicle 10 to attempt the lane change with a greater space margin than when the midsize vehicle 910 is traveling.

Figure 10:
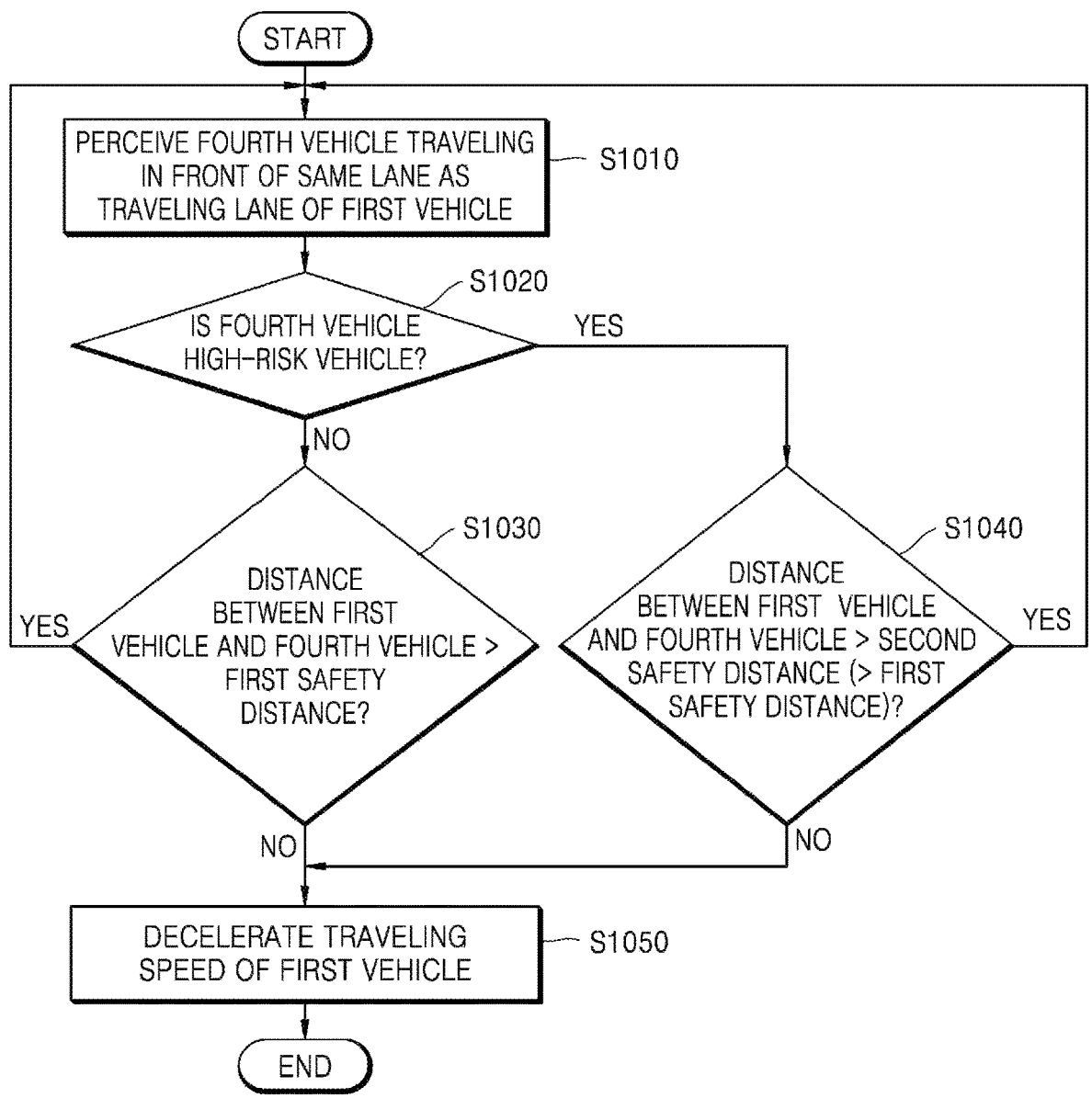
FIG. 10 is a flowchart illustrating an example method of determining a traveling speed of a first vehicle based on a type of a front vehicle, according to an embodiment.

FIG. 10 is a flowchart illustrating an example method of determining a traveling speed of the first vehicle 10 based on a type of a front vehicle according to an embodiment.

In operation S1010, the device 100 may perceive a fourth vehicle traveling in front of the same lane as a traveling lane of the first vehicle 10.

According to an embodiment, the device 100 may perceive the fourth vehicle using at least one sensor mounted on the first vehicle 10 and/or a precision map. For example, the device 100 may perceive a presence of the fourth vehicle and a type of the fourth vehicle using, for example, and without limitation, an image sensor, a radar sensor, a lidar sensor, or the like. The device 100 may analyze a series of frames obtained through the image sensor to determine a speed of the fourth vehicle. The device 100 may also determine a relative distance between the first vehicle 10 and the fourth vehicle using a distance sensor mounted on the first vehicle 10. The device 100 may perceive a current position of the first vehicle 10 using a position sensor (e.g., a GPS) and may detect a current speed/direction of the first vehicle 10 using, for example, and without limitation, an inertial sensor, a geomagnetism sensor, an acceleration sensor, a gyroscope sensor, or the like.

According to an embodiment, the device 100 may perceive a current traveling lane of the first vehicle 10, a current traveling lane of the fourth vehicle, a stop line, a road condition, a road structure mark, or the like, using the precision map.

The device 100 may use sensing information collected from sensors mounted on the first vehicle 10 and/or the precision map to perceive that the fourth vehicle is in front of the first vehicle 10, the fourth vehicle is traveling in the same lane as the traveling lane of the first vehicle 10 and the type of the fourth vehicle, but is not limited thereto.

In operation S1020, the device 100 may determine whether the fourth vehicle is a high-risk vehicle.

According to an embodiment, the device 100 may determine a risk of the fourth vehicle based on a type of the fourth vehicle. The device 100 may then compare the risk of the fourth vehicle with a threshold value to determine whether the fourth vehicle is a high-risk vehicle. For example, when the risk of the fourth vehicle is greater than a threshold value (e.g., 1.5), the device 100 may determine that the fourth vehicle is the high-risk vehicle. When the risk of the fourth vehicle is equal to or less than the threshold value (e.g., 1.5), the device 100 may determine that the fourth vehicle is a low-risk vehicle.

In operations S1030 and S1050, the device 100 may determine whether a distance between the first vehicle 10 and the fourth vehicle is longer than a first safety distance when the fourth vehicle is not the high-risk vehicle (for example, when the fourth vehicle is a low-risk vehicle). The first safety distance may be predefined. For example, the first safety distance may be a safety distance of the first vehicle 10 with respect to the low-risk vehicle.

According to an embodiment, when the distance between the first vehicle 10 and the fourth vehicle is equal to or less than the first safety distance, the device 100 may determine that the traveling speed of the first vehicle 10 is decelerated such that the distance between the first vehicle 10 and the fourth vehicle increases. On the other hand, when the distance between the first vehicle 10 and the fourth vehicle is longer than the first safety distance, the device 100 may plan a traveling path of the first vehicle 10 to maintain a current speed of the first vehicle 10 or accelerate the traveling speed of the first vehicle 10. When the first vehicle 10 is accelerated and the distance between the first vehicle 10 and the fourth vehicle is equal to or less than the first safety distance, the device 100 may determine again that the traveling speed of the first vehicle 10 is decelerated.

In operations S1040 and S1050, when the fourth vehicle is a high-risk vehicle, the device 100 may determine whether the distance between the first vehicle 10 and the fourth vehicle is longer than a second safety distance. The second safety distance may be predefined. For example, the second safety distance may be a safety distance of the first vehicle 10 with respect to the high-risk vehicle. The second safety distance may be longer than the first safety distance which is the safety distance of the first vehicle 10 with respect to the low-risk vehicle.

According to an embodiment, when the distance between the first vehicle 10 and the fourth vehicle is equal to or less than the second safety distance, the device 100 may determine that the traveling speed of the first vehicle 10 is decelerated such that the distance between the first vehicle 10 and the fourth vehicle increases.

When the distance between the first vehicle 10 and the fourth vehicle is longer than the second safety distance, the device 100 may plan the traveling path of the first vehicle 10 to maintain the current speed of the first vehicle 10 or accelerate the traveling speed of the first vehicle 10. When the first vehicle 10 accelerates and the distance between the first vehicle 10 and the fourth vehicle is less than or equal to the second safety distance, the device 100 may determine again that the traveling speed of the first vehicle 10 is decelerated.

According to an embodiment, the device 100 may plan the traveling path of the first vehicle 10 such that the first vehicle 10 may travel at a distance longer than a predefined safety distance according to the risk of the front vehicle. An operation of the device 100 for planning the traveling path of the first vehicle 10 according to the type of the front vehicle will be described in greater detail below with reference to FIG. 11.

Figure 11:
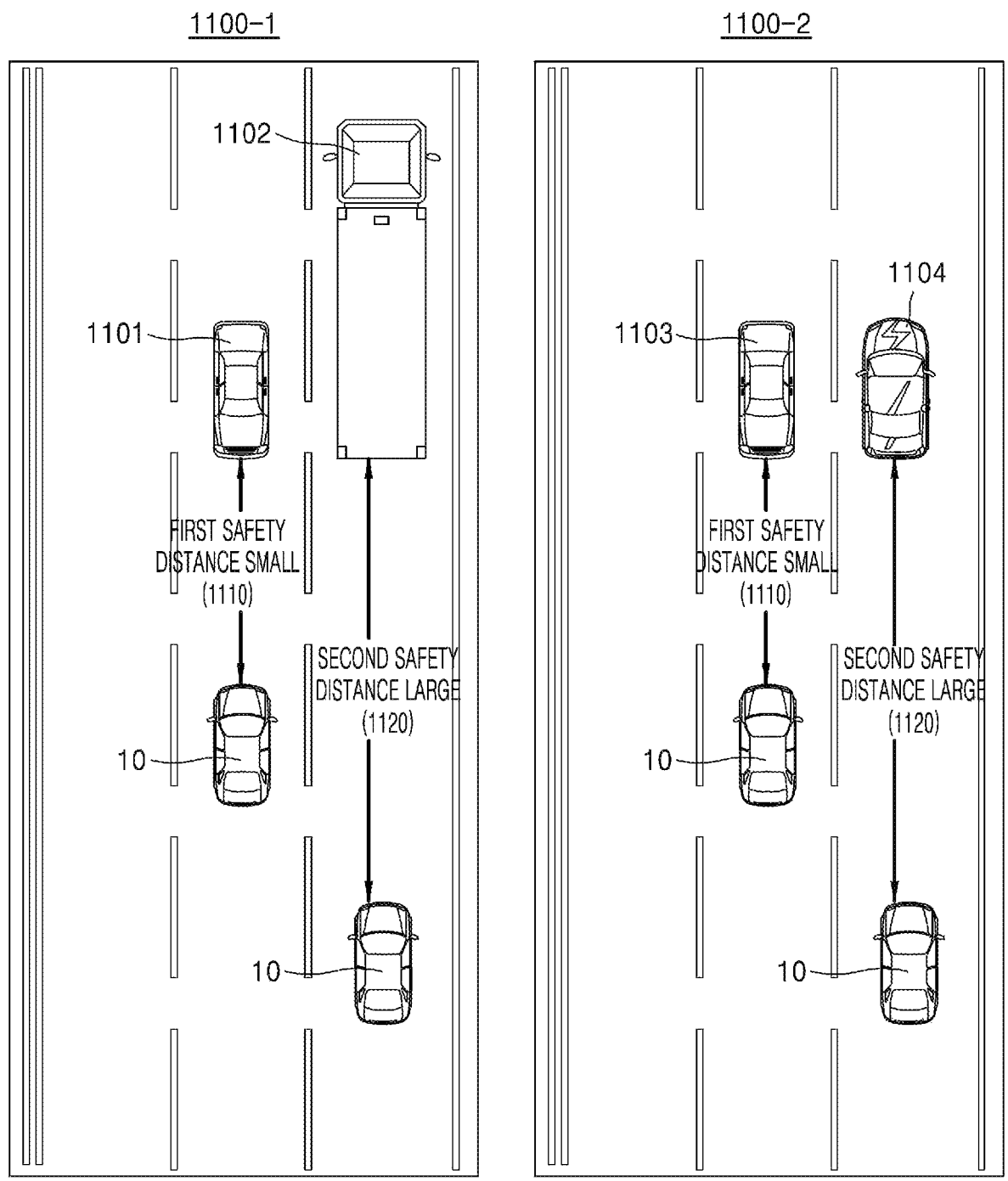
FIG. 11 is a diagram illustrating an example operation of determining a traveling speed of a first vehicle based on a type of a front vehicle, according to an embodiment.

FIG. 11 is a diagram illustrating an example operation of determining a traveling speed of the first vehicle 10 based on a type of a front vehicle according to an embodiment.

Referring to 1100-1 in FIG. 11, when the device 100 perceives a midsize vehicle 1101 traveling in front of the same lane, the device 100 may determine a traveling speed of the first vehicle 10 such that a distance between the first vehicle 10 and the midsize vehicle 1101 is longer than a first safety distance (e.g., 70 m) 1110. Also, when the device 100 perceives a large-size vehicle 1102 traveling in front of the same lane, the device 100 may determine the traveling speed of the first vehicle 10 such that a distance between the first vehicle 10 and the large-size vehicle 1102 is longer than a second safety distance (e.g., 100 m). Since a risk of the large-size vehicle 1102 is larger than that of the midsize vehicle 1101, the second safety distance 1120 with respect to a large-size vehicle 1102 may be defined to be longer than the first safety distance with respect to the midsize vehicle 1101.

For example, when a distance between the external vehicle traveling in front of the same lane and the first vehicle 10 is 80 m, the device 100 may determine that the first vehicle 10 maintains a current speed when the external vehicle is the midsize vehicle 1101, and may determine that a traveling speed of the first vehicle 10 is decelerated such that the distance between the first vehicle 10 and the large-size vehicle 1102 is 100 m or more when the external vehicle is the large-size vehicle 1102. For example, the device 100 may plan a traveling path of the first vehicle 10 such that the higher the risk of the external vehicle traveling in front of the first vehicle 10, the greater the distance between the first vehicle 10 and the front vehicle maintains, thereby enhancing a stability of the traveling of the first vehicle 10.

Referring to 1100-2 in FIG. 11, when the device 100 perceives the general sedan 1103 traveling in front of the same lane, the device 100 may determine the traveling speed of the first vehicle 10 such that a distance between the first vehicle 10 and the general sedan 1103 is longer than a first safety distance 1110 (e.g., 70 m). When the device 100 perceives a sports car 1104 traveling in front of the same lane, the device 100 may determine the traveling speed of the first vehicle 10 such that a distance between the first vehicle 10 and the sports car 1104 is longer than a second safety distance 1120 (e.g., 100 m). For example, since the sports car 1104 has a better braking force than that of the general sedan 1103, when the sports car 1104 suddenly brakes, the first vehicle 10 traveling in the rear may not keep up with the braking force of the sports car 1104 and may be dangerous, and thus the second safety distance with respect to the sports car 1104 may be defined to be longer than the first safety distance with respect to the general sedan 1103.

For example, when a distance between the external vehicle traveling in front of the same lane and the first vehicle 10 is 80 m, the device 100 may determine that the first vehicle 10 maintains the current speed when the external vehicle is the general sedan 1103, and may determine that the traveling speed of the first vehicle 10 is decelerated when the external vehicle is the sports car 1104 such that the distance between the first vehicle 10 and the sports car 1104 is 100 m or more. For example, the device 100 may plan the traveling path of the first vehicle 10 such that the higher the braking force of the external vehicle traveling in front of the first vehicle 10, the greater the distance between the first vehicle 10 and the front vehicle maintains, thereby enhancing the stability of the traveling of the first vehicle 10.

Although not shown in FIG. 11, the device 100 may define the safety distance of the first vehicle 10 with respect to the front vehicle differently based on a price of the front vehicle. For example, the second safety distance with respect to a high-cost front vehicle may be defined to be longer than the first safety distance with respect to a low-cost front vehicle.

Figure 12:
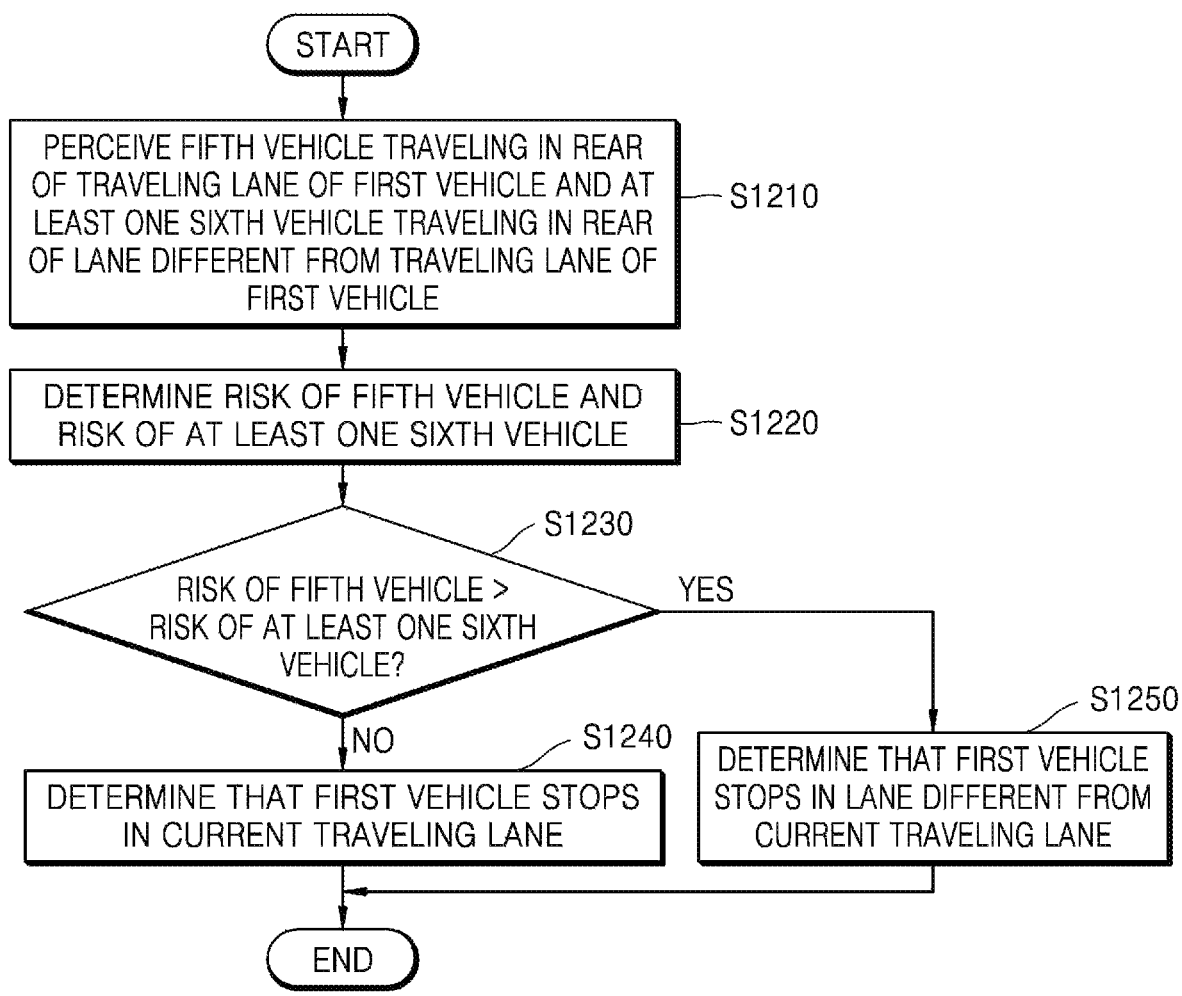
FIG. 12 is a flowchart illustrating an example method of determining a lane for a first vehicle to stop based on a type of a nearby vehicle, according to an embodiment.

FIG. 12 is a flowchart illustrating an example method performed by the device 100 of determining a lane (hereinafter referred to as a stop lane) for the first vehicle 10 to stop based on a type of a surrounding vehicle according to an embodiment.

In operation S1210, the device 100 may perceive a fifth vehicle traveling in the rear of a traveling lane of the first vehicle 10 and at least one sixth vehicle traveling in the rear of a lane different from the traveling lane of the first vehicle 10.

According to an embodiment, the device 100 may perceive the fifth vehicle and the at least one sixth vehicle using at least one sensor mounted on the first vehicle 10 and/or a precision map. For example, the device 100 may use, for example, and without limitation, an image sensor, a radar sensor a lidar sensor, or the like, to determine a presence of a fifth vehicle, a presence of the at least one sixth vehicle, a type of a fifth vehicle, a type of the at least one sixth vehicle, etc. The device 100 may analyze a series of frames obtained through the image sensor to determine a speed of the fifth vehicle and a speed of the at least one sixth vehicle. The device 100 may also determine a relative distance between the first vehicle 10 and the fifth vehicle, a relative distance between the first vehicle 10 and the at least one sixth vehicle, etc. using a distance sensor mounted on the first vehicle 10. The device 100 may perceive a current position of the first vehicle 10 using a position sensor (e.g., a GPS) and may perceive a current position/direction of the first vehicle 10 using an inertial sensor, a geomagnetism sensor, an acceleration sensor, a gyroscope sensor, etc.

According to an embodiment, the device 100 may use the precision map to perceive a current traveling lane of the first vehicle 10, a current traveling lane of the fifth vehicle, a current traveling lane of the at least one sixth vehicle, a stop line, a road condition, a road structure mark, and the like.

The device 100 may use sensing information collected from the sensors mounted on the first vehicle 10 and/or the precision map to perceive that the fifth vehicle and the at least one sixth vehicle are present in the rear of the first vehicle 10, the fifth vehicle is traveling in the same lane as the traveling lane of the first vehicle 10, the at least one sixth vehicle is traveling in a lane different from the traveling lane of the first vehicle 10, and the type of the fifth vehicle and the type of the at least one sixth vehicle.

In operation S1220, the device 100 may determine a risk of the fifth vehicle and a risk of the at least one sixth vehicle.

According to an embodiment, the device 100 may determine the risk of the fifth vehicle based on the type of the fifth vehicle. The device 100 may determine the risk of the at least one sixth vehicle based on the type of the at least one sixth vehicle.

Since operation S1220 corresponds to operation S220 of FIG. 2, a detailed description thereof will not be repeated here.

In operation S1230, the device 100 may determine whether the risk of the fifth vehicle is greater than the risk of the at least one sixth vehicle.

For example, when the fifth vehicle is a midsize vehicle, and the at least one sixth the vehicle is a bus, the device 100 may determine that the risk of the fifth vehicle is lower than the risk of the at least one sixth vehicle. When the fifth vehicle is a large truck and the at least one sixth vehicle is a small-size vehicle, the device 100 may determine that the risk of the fifth vehicle is higher than the risk of the at least one sixth vehicle.

In operation S1240, when the risk of the fifth vehicle is lower than or equal to the risk of the at least one sixth vehicle, the device 100 may determine that the first vehicle 10 stops in the current traveling lane. For example, the device 100 may determine that a stop lane of the first vehicle 10 is the current traveling lane.

In operation S1250, the device 100 may determine that the first vehicle 10 stops in a different lane from the current traveling lane when the risk of the fifth vehicle is higher than the risk of the at least one sixth vehicle. For example, the device 100 may determine that the stop lane of the first vehicle 10 is a lane in which the at least one sixth vehicle is traveling, other than the current traveling lane.

The operation of the device 100 for determining the stop lane of the first vehicle 10 based on types of rear vehicles will be described in greater detail with reference to FIG. 13.

Figure 13:
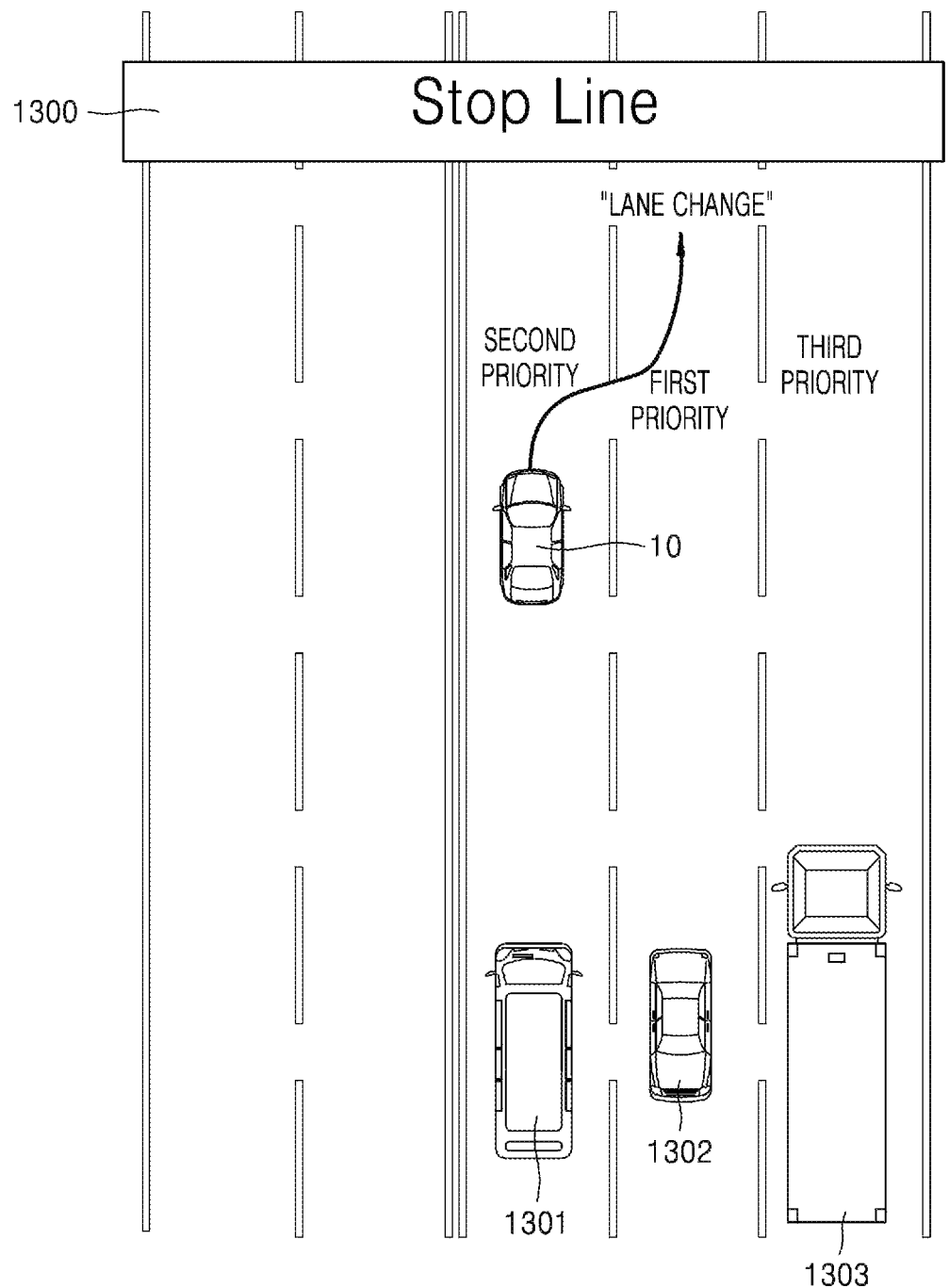
FIG. 13 is a diagram illustrating an example operation of determining a stop lane based on risks due to rear vehicles, according to an embodiment.

FIG. 13 is a diagram illustrating an example operation of the device 100 for determining a stop lane based on risks of rear vehicles according to an embodiment.

Referring to FIG. 13, when the first vehicle 10 is traveling in a first lane, the device 100 may perceive a stop line 1300. The stop line 1300 may be an actual stop line near a traffic light or may be a virtual stop line made when front vehicles stop, but is not limited thereto.

According to an embodiment, the device 100 may perceive a van 1301 traveling in the rear of the first lane, a midsize vehicle 1302 traveling in the rear of a second lane, and a large truck 1303 traveling in the rear of a third lane, based on sensing information collected from at least one sensor and/or a precision map.

The device 100 may determine a risk of each of external vehicles based on a type of each of the external vehicles. For example, the device 100 may determine a risk of the van 1301 as 1.5, a risk of the midsize vehicle 1302 as 1.0, and a risk of the large truck 1303 as 2.0.

The device 100 may then determine the safest lane that the first vehicle 10 stops based on the risk of each of the external vehicles. For example, the device 100 may determine that the second lane in which the midsize vehicle 1302 is traveling has a first priority, the first lane in which the van 1301 is traveling has a second priority, and the third lane in which the large truck 1303 is traveling has a third priority. For example, since a braking force of the midsize vehicle 1302 is the best, it may be safest that the first vehicle 10 stops in front of the midsize vehicle 1302.

The device 100 may plan a traveling path of the first vehicle 10 such that the first vehicle 10 changes from the first lane to the second lane since the second lane is determined as having the first priority. According to an embodiment, the device 100 may plan the traveling path of the first vehicle 10 such that the first vehicle 10 may stop at the safest lane.

Figure 14:
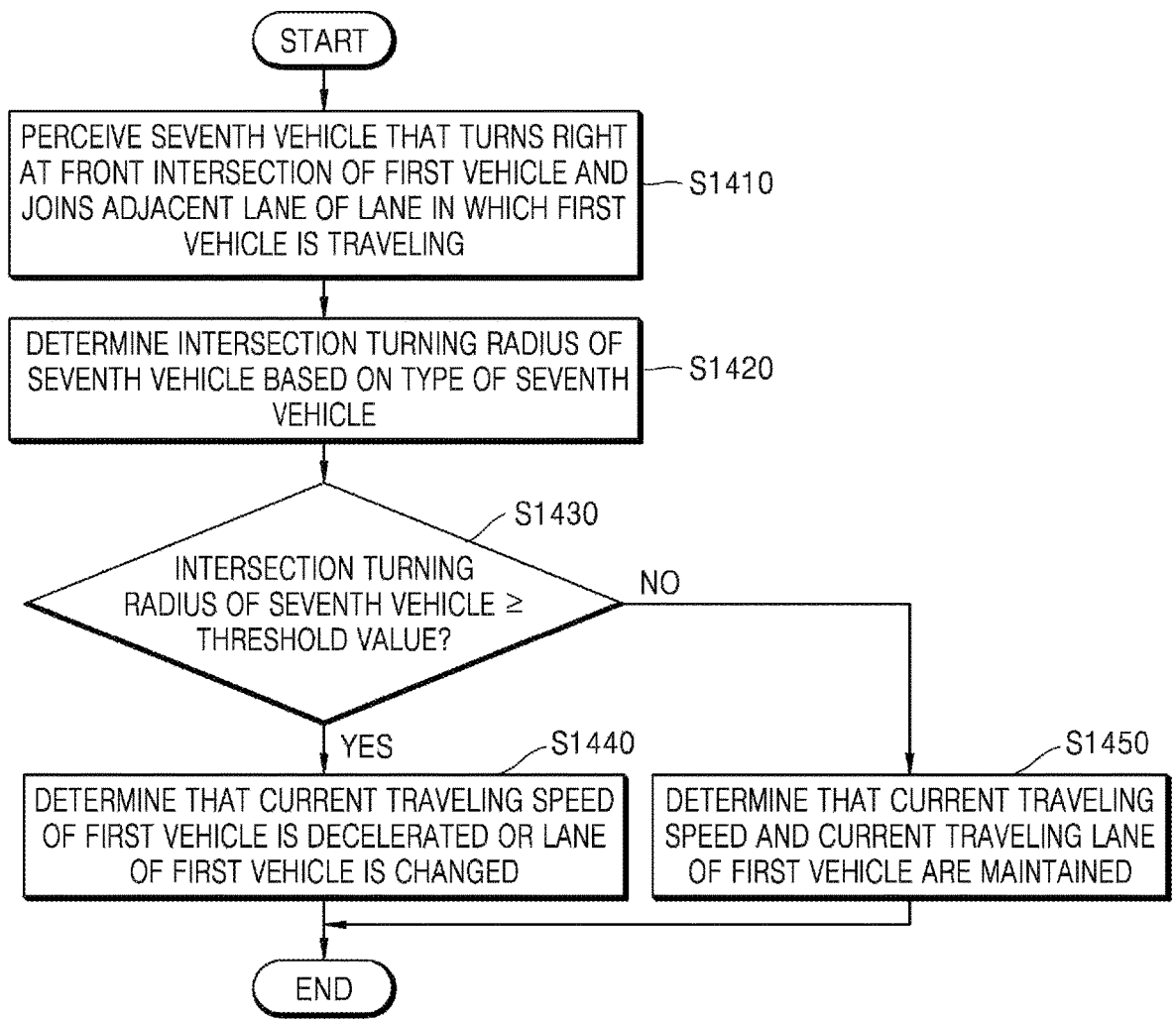
FIG. 14 is a flowchart illustrating an example method of determining a motion of a vehicle at an intersection, according to an embodiment.

FIG. 14 is a flowchart illustrating an example method of determining a traveling path of a vehicle at an intersection according to an embodiment.

In operation S1410, the device 100 may perceive a seventh vehicle that turns right at a front intersection of the first vehicle 10 and joins an adjacent lane of a lane in which the first vehicle 10 is traveling.

According to an embodiment, the device 100 may perceive the seventh vehicle, using at least one sensor mounted on the first vehicle 10 and/or a precision map. For example, the device 100 may perceive a presence of the seventh vehicle and a type of the seventh vehicle, using, for example, and without limitation, an image sensor, a radar sensor, a lidar sensor, or the like. The device 100 may analyze a series of frames obtained through the image sensor to determine a speed of the seventh vehicle. The device 100 may also determine a relative distance between the first vehicle 10 and the seventh vehicle using a distance sensor mounted on the first vehicle 10. The device 100 may perceive a current position of the first vehicle 10 using a position sensor (e.g., a GPS) and may perceive a current speed/direction of the first vehicle 10 using an inertial sensor, a geomagnetism sensor, an acceleration sensor, a gyroscope sensor, etc.

According to an embodiment, the device 100 may perceive a current traveling lane of the first vehicle 10, a current traveling lane of the seventh vehicle, a road condition, a road structure mark, etc. using the precision map.

Accordingly, the device 100 may use sensing information collected from sensors mounted on the first vehicle 10 and/or the precision map to perceive that the intersection is present in front of the first vehicle 10, the seventh vehicle is predicted to join the adjacent lane of the lane in which the first vehicle 10 is traveling when turning right, and a type of the seventh vehicle, but is not limited thereto.

In operation S1420, the device 100 may determine an intersection turning radius of the seventh vehicle based on the type of the seventh vehicle. The intersection turning radius of the seventh vehicle may refer, for example, to a turning radius of outer wheels of the seventh vehicle.

According to an embodiment, the intersection turning radius may increase from a small-size vehicle to a large-size vehicle. Therefore, when the seventh vehicle is the large-size vehicle, the intersection turning radius of the seventh vehicle may be larger than that when the seventh vehicle is the small-size vehicle.

In operation S1430, the device 100 may determine whether the intersection turning radius of the seventh vehicle is greater than a threshold value. Here, the threshold value may be a value of a turning radius of the seventh vehicle that may cross the lane in which the first vehicle 10 is traveling.

In operation S1440, the device 100 may determine that a current traveling speed of the first vehicle 10 is decelerated or the lane of the first vehicle 10 is changed when the intersection turning radius of the seventh vehicle greater than the threshold value.

According to an embodiment, when the intersection turning radius of the seventh vehicle is greater than the threshold value, the seventh vehicle may turn right at the intersection and cross the lane in which the first vehicle 10 is currently traveling. Accordingly, the device 100 may plan a traveling path of the first vehicle 10 to decelerate a current traveling speed of the first vehicle 10 or to stop the first vehicle 10 in front of the intersection such that the first vehicle 10 does not collide with the seventh vehicle. The device 100 may also determine that the lane of the first vehicle 10 is changed when the first vehicle 10 is able to change the lane to another lane.

In operation S1450, the device 100 may determine that the current traveling speed and the current traveling lane of the first vehicle 10 are maintained when the intersection turning radius of the seventh vehicle is less than or equal to the threshold value.

According to an embodiment, when the intersection turning radius of the seventh vehicle is less than or equal to the threshold value, there is a high possibility that the seventh vehicle may not cross the lane in which the first vehicle 10 is currently traveling while turning right at the intersection. The device 100 may determine that the first vehicle 10 continues to travel in the current traveling lane at the current traveling speed.

An operation of the device 100 for planning the traveling path of the first vehicle 10 based on an intersection turning radius of an external vehicle will be described in greater detail with reference to FIG. 15.

Figure 15:
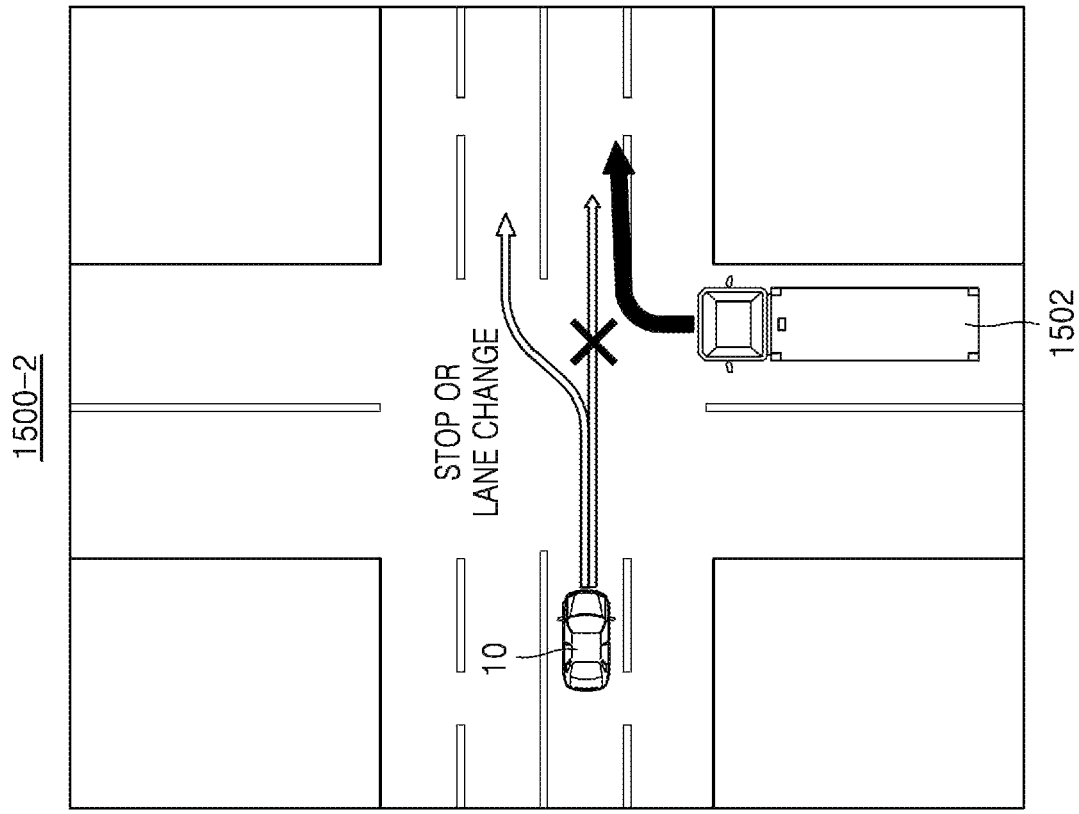
FIG. 15 is a diagram illustrating an example operation of determining a motion of a vehicle based on a type of a nearby vehicle at an intersection, according to an embodiment.
Figure 15:
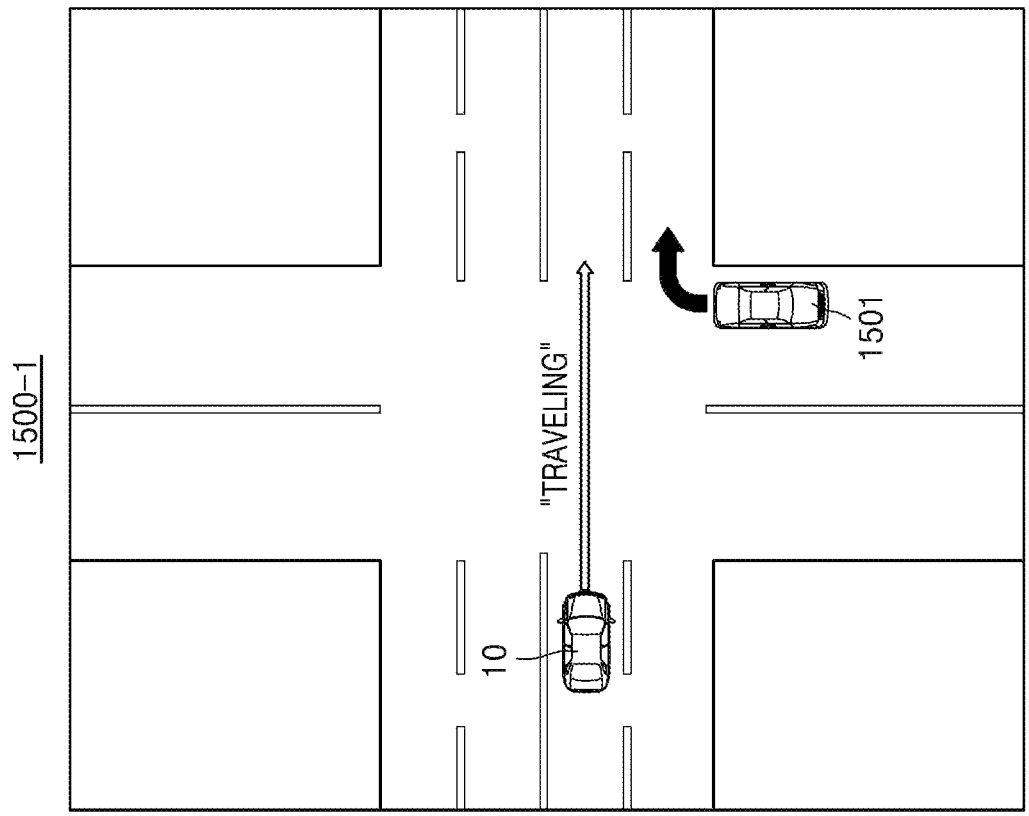

FIG. 15 is a diagram illustrating an example operation of the device 100 for determining a traveling path of a vehicle based on a type of a surrounding vehicle at an intersection according to an embodiment. In FIG. 15, a case where the first vehicle 10 is traveling in a third lane will be described as an example.

Referring to 1500-1 of FIG. 15, the device 100 may use sensing information collected from at least one sensor mounted on the first vehicle 10 and/or a precision map to perceive a midsize vehicle 1501 that turns right at an intersection and joins a fourth lane.

The device 100 may determine whether an intersection turning radius of the midsize vehicle 1501 is equal to or greater than a threshold turning radius. The threshold turning radius may refer, for example, to a turning radius at which a vehicle that turns right may cross a third lane. For example, the intersection turning radius of the midsize vehicle 1501 may be '7' and the threshold turning radius may be '10'.

The device 100 may determine that there is no possibility that the midsize vehicle 1501 may cross the third lane when turning right since the intersection turning radius (for example, 7) of the midsize vehicle 1501 is less than the threshold turning radius (for example 10). Thus, the device 100 may plan a traveling path of the first vehicle 10 such that the first vehicle 10 continues to travel in the third lane.

Referring to 1500-2 of FIG. 15, the device 100 may use the sensing information collected from the at least one sensor mounted on the first vehicle 10 and/or the precision map to perceive a large truck 1502 that turns right at the intersection and joins the fourth lane.

The device 100 may determine whether an intersection turning radius of the large truck 1502 is greater than the threshold turning radius. For example, the intersection turning radius of the large truck 1502 may be '13' and the threshold turning radius may be '10'. The device 100 may determine that there is a high possibility that the large truck 1502 may cross the third lane when turning right since the intersection turning radius (e.g., 13) of the large truck 1502 is greater than the threshold turning radius. The device 100 may determine that the lane of the first vehicle 10 is changed or may determine that the first vehicle 10 stops in front of the intersection.

For example, the device 100 may determine that the traveling lane of the first vehicle 10 is changed from the third lane to a second lane. However, when it is difficult to change the lane of the first vehicle 10 since another external vehicle is traveling in the second lane, the device 100 may plan the traveling path of the first vehicle 10 such that the first vehicle 10 stops in front of the intersection.

Thus, according to an embodiment, the device 100 may plan the traveling path of the first vehicle 10 entering the intersection, in consideration of the intersection turning radius of the external vehicle turning right at a front intersection, thereby allowing the first vehicle 10 to safely traveling at the intersection.

Figure 16:
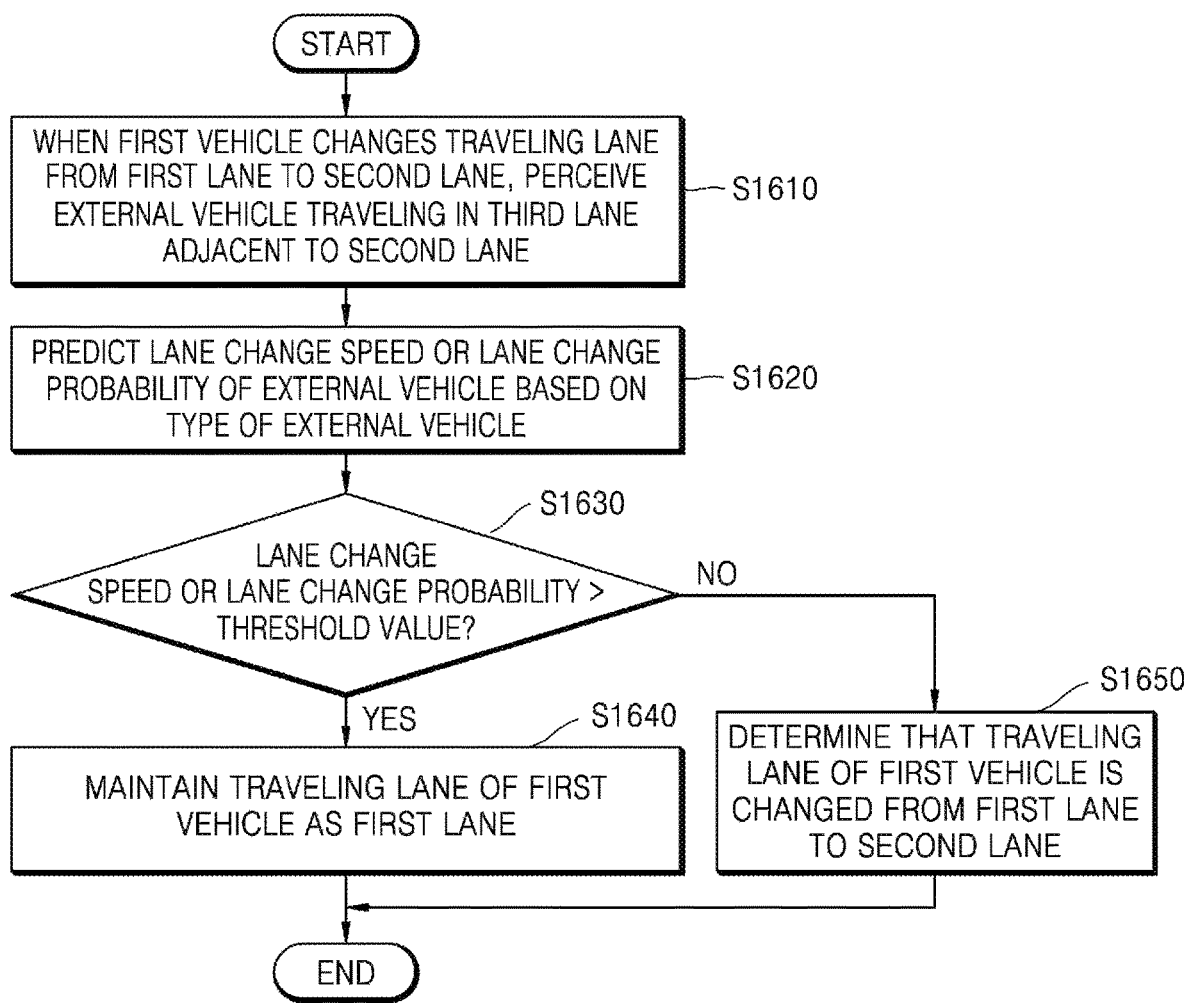
FIG. 16 is a flowchart illustrating an example method of determining whether to change a lane of a first vehicle based on a lane change speed or a lane change probability of an external vehicle, according to an embodiment.

FIG. 16 is a flowchart illustrating an example method of determining whether to change a lane of the first vehicle 10 based on a lane change speed or a lane change probability of an external vehicle according to an embodiment.

In operation S1610, when the first vehicle 10 changes a traveling lane from a first lane to a second lane, the device 100 may perceive the external vehicle traveling in a third lane adjacent to the second lane.

For example, when the first vehicle 10 changes the traveling lane from the first lane to the second lane, the device 100 may perceive the external vehicle traveling in the third lane. When the first vehicle 10 changes the traveling lane from a fourth lane to the third lane, the device 100 may perceive the external vehicle traveling in the second lane.

According to an embodiment, the device 100 may perceive the external vehicle traveling in the third lane, using at least one sensor mounted on the first vehicle 10 and/or a precision map. For example, the device 100 may use sensing information collected from sensors mounted on the first vehicle 10 and/or the precision map to perceive that the first vehicle 10 is traveling in the first lane, the external vehicle is traveling in the third lane, and a type of the external vehicle.

In operation S1620, the device 100 may predict the lane change speed or the lane change probability of the external vehicle based on the type of the external vehicle.

According to an embodiment, the lane change speed or the lane change probability of the external vehicle may be reduced from a small-size vehicle to a large-size vehicle. Accordingly, when the type of the external vehicle is the large-size vehicle, the lane change speed or the lane change probability may be lower than when the type of the external vehicle is the small-size vehicle.

In operations S1630 and S1640, when the lane change speed or the lane change probability of the external vehicle is greater than a threshold value, the device 100 may plan a traveling path of the first vehicle 10 such that the traveling lane of the first vehicle 10 is maintained as the first lane. However, the device 100 may monitor a state of the external vehicle, and, when the external vehicle does not change a traveling lane from the third lane to the second lane for a predetermined time, determine that the traveling lane of the first vehicle 10 is changed from the first lane to the second lane.

In operations S1630 and S1650, when the lane change speed or the lane change probability of the external vehicle is equal to or less than the threshold value, the device 100 may determine that the traveling lane of the first vehicle 10 is changed from the first lane to the second lane. This is because when the lane change speed or the lane change probability of the external vehicle is equal to or less than the threshold value, the device 100 may determine that there is a low possibility that the external vehicles changes the traveling lane from the third lane to the second lane when the first vehicle 10 changes the traveling lane from the first lane to the second lane.

An operation of the device 100 for planning the traveling path of the first vehicle 10 in consideration of a lane change speed or a lane change probability of the external vehicle will be described in greater detail with reference to FIG. 17.

Figure 17:
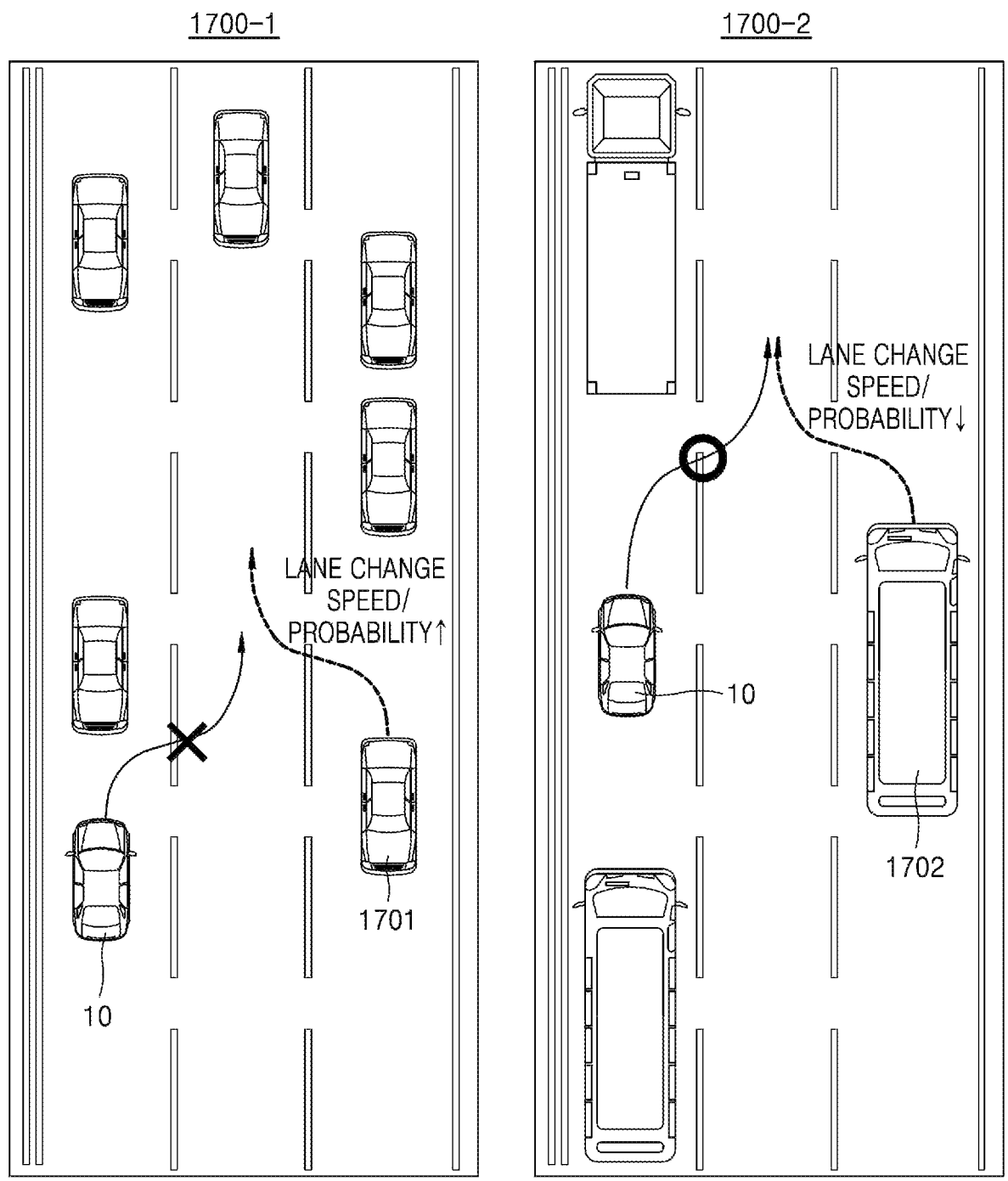
FIG. 17 is a diagram illustrating an example operation of determining whether to change a lane of a first vehicle based on a lane change speed or a lane change probability of an external vehicle according to an embodiment.

FIG. 17 is a diagram illustrating an example operation of determining whether to change a lane of the first vehicle 10 based on a lane change speed or a lane change probability of an external vehicle according to an embodiment. In FIG. 17, a case where the first vehicle 10 is traveling in a first lane will be described as an example.

Referring to 1700-1 in FIG. 17, the device 100 may perceive a midsize vehicle 1701 traveling in a third lane when changing the traveling lane of the first vehicle 10. The device 100 may determine that a lane change speed or a lane change probability of the midsize vehicle 1701 is greater than a threshold value. In this case, when the first vehicle 10 changes the traveling lane from a first lane to a second lane, since there is a high possibility that the first vehicle 10 collides with the midsize vehicle 1701 that changes from a third lane to the second lane, the device 100 may determine that the traveling lane of the first vehicle 10 is not changed. The device 100 may determine that the first vehicle 10 maintains a current traveling lane and may monitor a state of the midsize vehicle 1701. When the midsize vehicle 1701 does not change a traveling lane from the third lane to the second lane for a predetermined time (for example, 30 seconds), the device 100 may determine that the traveling lane of the first vehicle 10 is changed from the first lane to the second lane.

Referring to 1700-2 in FIG. 17, the device 100 may perceive a bus 1702 traveling in the third lane when changing the traveling lane of the first vehicle 10. The device 100 may determine that a lane change speed or a lane change probability of the bus 1702 is less than the threshold value. Since there is a high possibility that the bus 1702 generally travels in the third lane or in a bus-only lane, the lane change probability of the bus 1702 may be low. Also, the lane change speed of the bus 1702 may not be high.

When the first vehicle 10 changes the traveling lane from the first lane to the second lane, since there is a low possibility that the first vehicle 10 collides with the bus 1702 that changes from the third lane to the second lane, the device 100 may determine that the traveling lane of the first vehicle 10 is changed from the first lane to the second lane.

According to an embodiment, since the lane change speed and the lane change probability of the midsize vehicle 1701 are higher than those of the bus 1702, the device 100 may carefully determine a lane change of the first vehicle 10 when the midsize vehicle 1701 travels rather than the bus 1702 travels, thereby increasing the traveling stability of the first vehicle 10.

Figure 18:
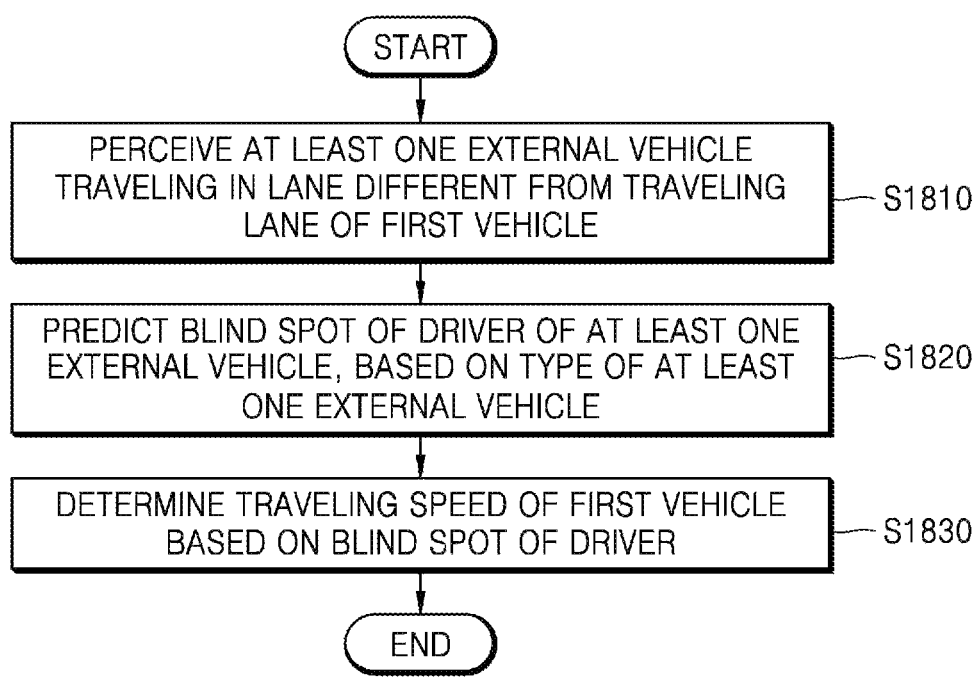
FIG. 18 is a flowchart illustrating an example method of planning a motion of a vehicle based on a blind spot of an external vehicle driver according to an embodiment.

FIG. 18 is a flowchart illustrating an example method of planning a traveling path of a vehicle based on a blind spot of an external vehicle driver according to an embodiment.

In operation S1810, the device 100 may perceive at least one external vehicle traveling in a lane different from a traveling lane of the first vehicle 10.

According to an embodiment, the device 100 may perceive the external vehicle using at least one sensor mounted on the first vehicle 10 and/or a precision map. For example, the device 100 may perceive a presence of the external vehicle and a type of the external vehicle using, for example, and without limitation, an image sensor, a radar sensor, a lidar sensor, or the like. The device 100 may analyze a series of frames obtained through the image sensor to determine a speed of the external vehicle. Also, the device 100 may determine a relative distance between the first vehicle 10 and the external vehicle using a distance sensor mounted on the first vehicle 10. The device 100 may perceive a current position of the first vehicle 10 using a position sensor (e.g., a GPS) and may detect a current speed/direction of the first vehicle 10 using an inertial sensor, a geomagnetism sensor, an acceleration sensor, a gyroscope sensor, etc.

According to an embodiment, the device 100 may use the precision map to perceive a current traveling lane of the first vehicle 10, a current traveling lane of the external vehicle, a stop line, a road condition, a road structure mark, etc.

Accordingly, the device 100 may use sensing information collected from sensors mounted on the first vehicle 10 and/or the precision map to perceive that the external vehicle is present around the first vehicle 10, the external vehicle is traveling in the lane different from the traveling lane of the first vehicle 10, and a type of the external vehicle, but is not limited thereto.

In operation S1820, the device 100 may predict the blind spot of the driver of the at least one external vehicle, based on the type of the at least one external vehicle.

The blind spot may refer, for example, to a region where a driver of a vehicle may not identify an adjacent vehicle, a roadway, an obstacle due to an obstacle factor, or the like, and may generally include a side region in the rear of the vehicle. The blind spot may be formed differently based on a type of the vehicle.

According to an embodiment, the device 100 may predict the blind spot of the driver of the at least one external vehicle, using blind spot data based on a previously stored vehicle type.

In operation S1830, the device 100 may determine a traveling speed of the first vehicle 10 based on the blind spot of the driver of the at least one external vehicle.

According to an embodiment, the device 100 may accelerate or decelerate the traveling speed of the first vehicle 10 when it is determined that the first vehicle 10 is currently in the blind spot of the driver.

According to an embodiment, when the blind spot of the driver of the at least one external vehicle is present in front of the first vehicle 10, the device 100 may determine that the first vehicle 10 maintains a current traveling speed. The device 100 may accelerate the traveling speed of the first vehicle 10 faster than a threshold speed to plan a traveling path of the first vehicle 10 that the first vehicle 10 passes quickly through the blind spot.

Figure 19:
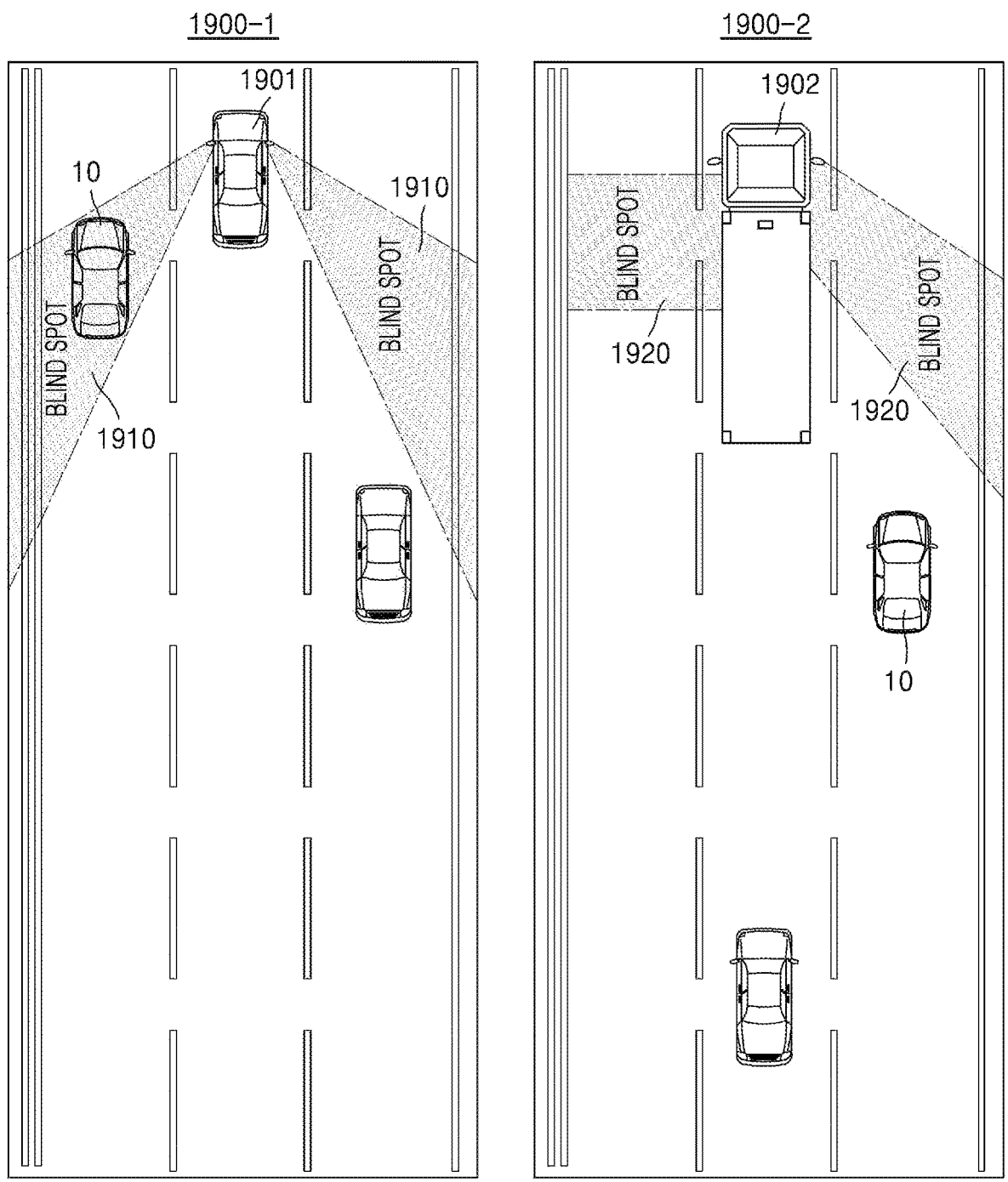
FIG. 19 is a diagram illustrating an example operation of predicting a blind spot according to a type of an external vehicle according to an embodiment.

FIG. 19 is a diagram illustrating an example operation of the device 100 for predicting a blind spot according to a type of an external vehicle according to an embodiment.

Referring to 1900-1 in FIG. 19, the first vehicle 10 may be traveling in a first lane. The device 100 may perceive a midsize vehicle 1901 traveling in a second lane using at least one sensor and/or a precise map. The device 100 may predict a blind spot 1910 of a driver of the midsize vehicle 1901. The device 100 may determine that a traveling speed of the first vehicle 10 is accelerated or decelerated when it is determined that a current position of the first vehicle 10 is within the blind spot 1910. The device 100 may plan a traveling path of the first vehicle 10 such that the first vehicle 10 quickly escapes from the blind spot 1910 of the driver of the midsize vehicle 1901, thereby increasing the traveling stability of the first vehicle 10.

Referring to 1900-2 in FIG. 19, the first vehicle 10 may be traveling in a third lane. The device 100 may perceive a large truck 1902 traveling in the second lane using the at least one sensor and/or the precision map. The device 100 may predict a blind spot 1920 of a driver of the large truck 1902.

The device 100 may determine that a traveling speed of the first vehicle 10 is maintained at a current speed or is decelerated such that the first vehicle 10 does not approach the blind spot 1920 when it is determined that the blind spot 1920 is present in front of the first vehicle 10. For example, when the traveling speed of the large truck 1902 is 70 km/h and the traveling speed of the first vehicle 10 is 70 km/h, the device 100 may determine that the first vehicle 10 continues to travel at 70 km/h.

The device 100 may accelerate the traveling speed of the first vehicle 10 faster than a threshold speed to plan a traveling path of the first vehicle 10 that the first vehicle 10 passes quickly through the blind spot 1920. For example, when a traveling speed of the large truck 1902 is 70 km/h, the device 100 may accelerate the traveling speed of the first vehicle 10 to 100 km/h or more to plan the traveling path of the first vehicle 10 that the first vehicle 10 passes quickly through the blind spot 1920.

The device 100 may automatically control the traveling speed of the first vehicle 10 when the first vehicle 10 is in autonomous traveling such that the first vehicle 10 avoids the blind spots 1910 and 1920. When the first vehicle 10 is not in autonomous traveling, the device 100 may output a warning message with respect to the blind spots 1910 and 1920. An operation of the device 100 for outputting a warning message will be described in greater detail with reference to FIG. 20.

Figure 20:
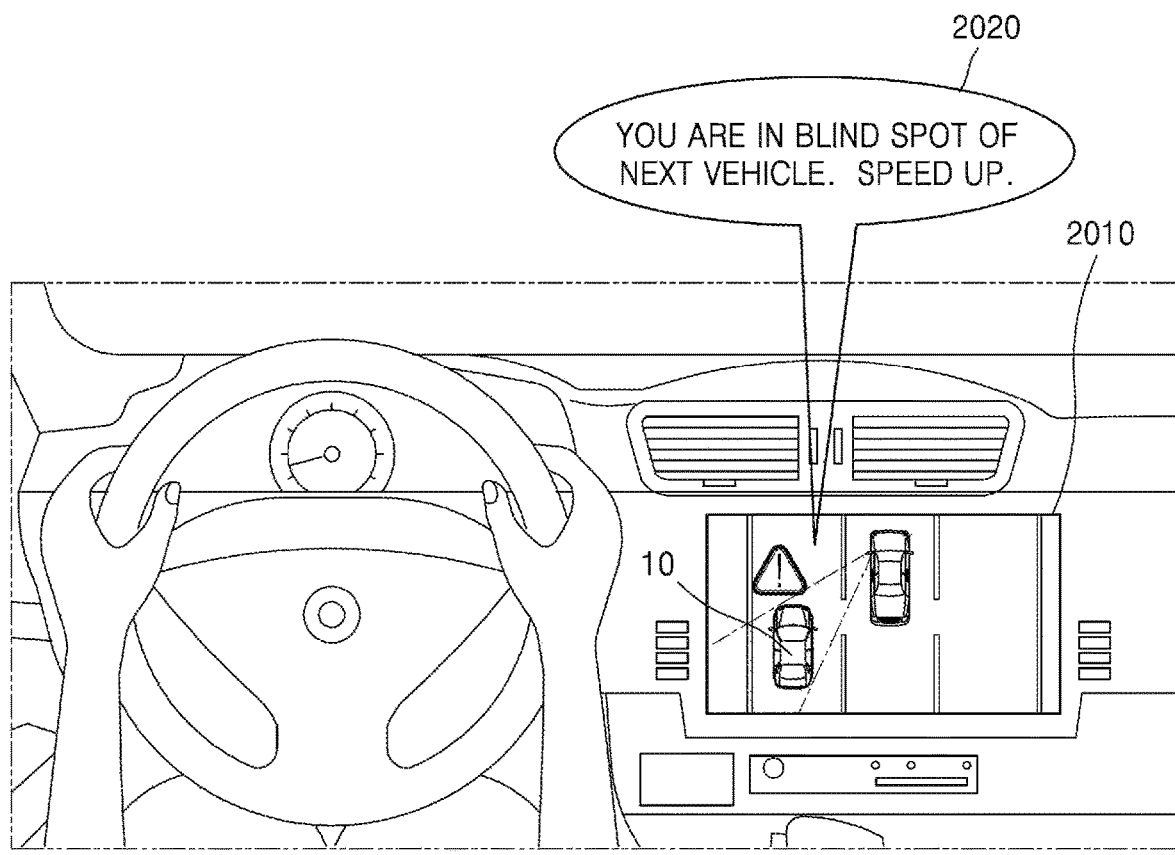
FIG. 20 is a diagram illustrating an example operation of outputting a warning message with respect to a blind spot according to an embodiment.

FIG. 20 is a diagram illustrating an example operation of the device 100 for outputting a warning message with respect to a blind spot according to an embodiment.

According to an embodiment, the device 100 may display a position of the first vehicle 10 and a position of an external vehicle on a map and may display, on a display, an indication 2010 indicating that the first vehicle 10 is located in the blind spot of a driver of the external vehicle, thereby visually providing the warning message with respect to the blind spot to a driver of the first vehicle 10.

The device 100 may output a voice message 2020 indicating that the first vehicle 10 is located in the blind spot of the driver of the external vehicle. For example, the device 100 may output a voice message 2020 "You are in the blind spot of the next vehicle. Speed up" to induce the driver of the first vehicle 10 to adjust a speed of the first vehicle 10.

Figure 21:
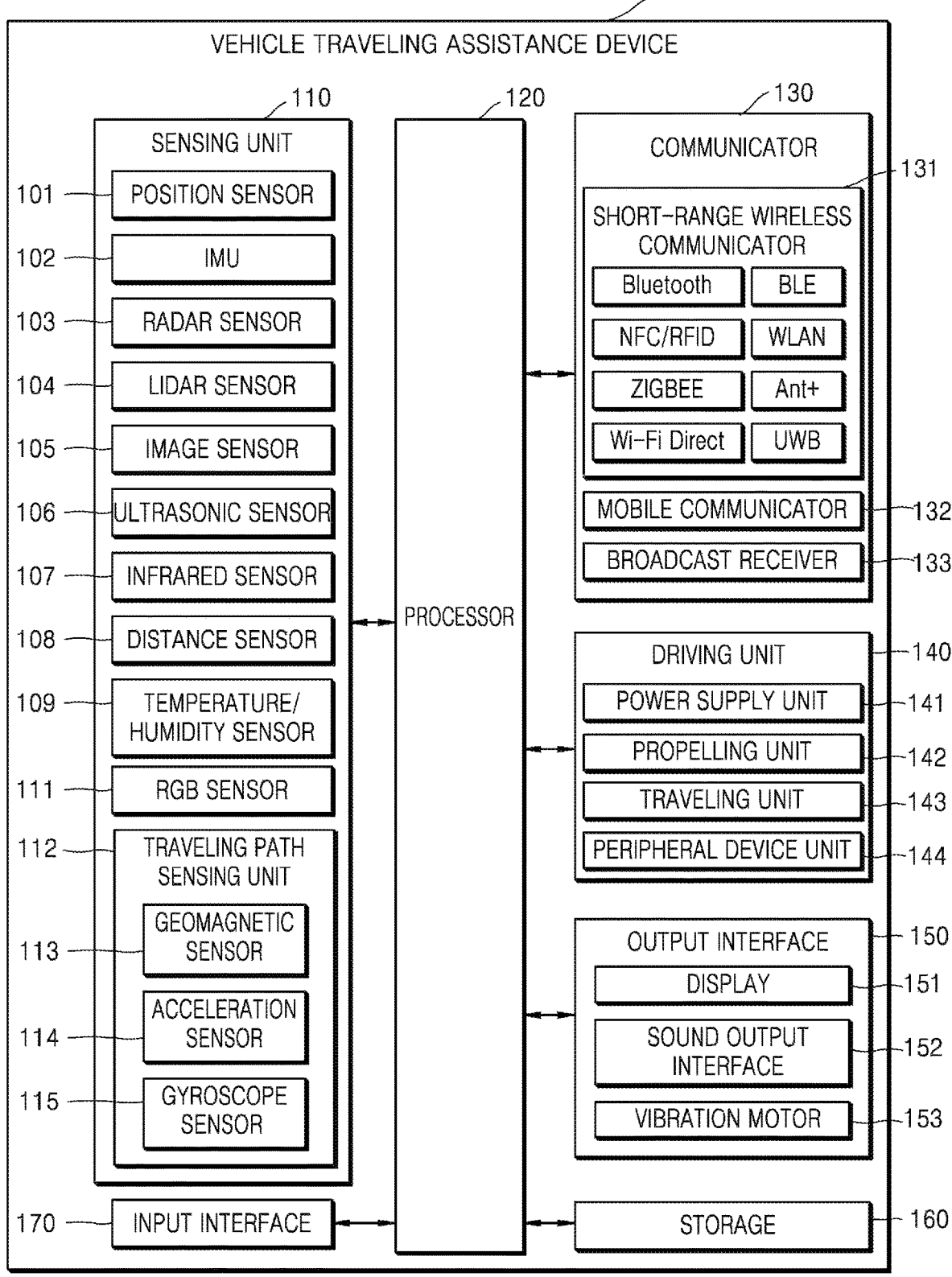
FIG. 21 is a block diagram illustrating an example configuration of an example vehicle traveling assistance device according to an embodiment.

FIG. 21 is a block diagram illustrating an example configuration of the device 100 according to an embodiment.

Figure 22:
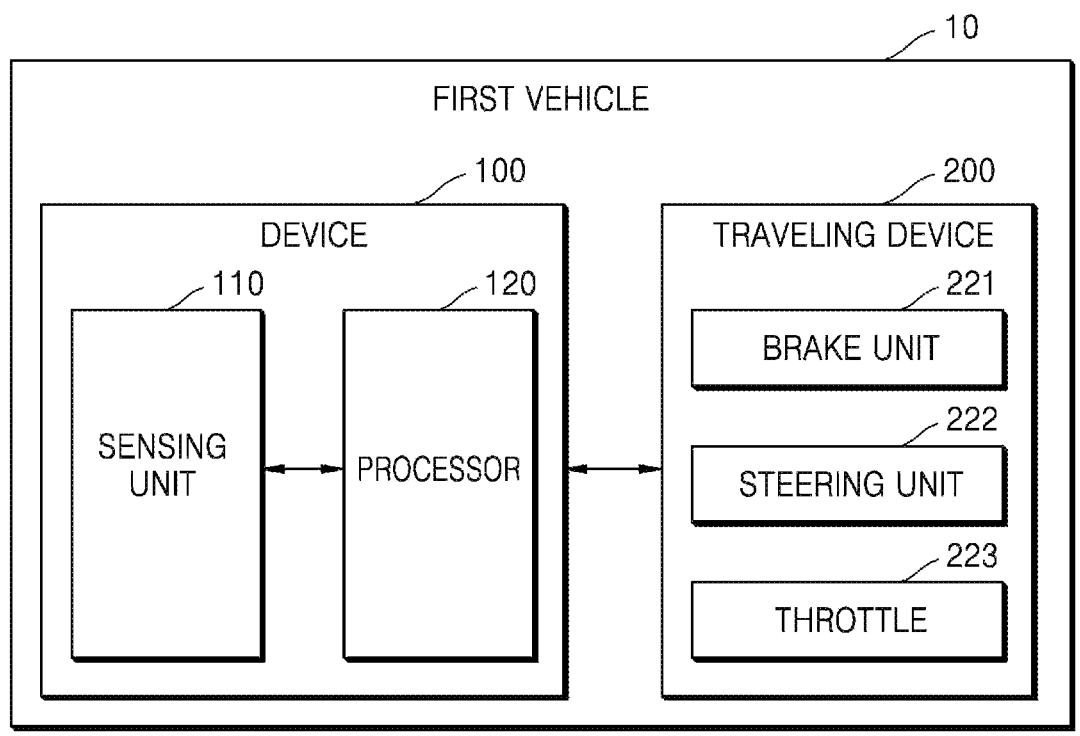
FIG. 22 is a block diagram illustrating an example configuration of an example vehicle according to an embodiment.

Referring to FIG. 21, the device 100 may include the sensing unit (e.g., including a sensor and/or sensing circuitry) 110, the processor (e.g., including processing circuitry) 120, the communicator (e.g., including communication circuitry) 130, a driving unit (e.g., including processing circuitry and/or executable program elements) 140, an output interface (e.g., including output circuitry) 150, a storage 160, and an input interface (e.g., including input circuitry) 170. However, all components shown in FIG. 21 are not indispensable components of the device 100. The device 100 may be implemented by more components than the components shown in FIG. 21 or by fewer components than those shown in FIG. 21. For example, as shown in FIG. 1, the device 100 may include the sensing unit 110, the processor 120, and the communicator 130, and, as shown in FIG. 22, the device may include the sensing unit 110 and the processor 120. The components will be described in order.

The sensing unit 110 may include a plurality of sensors and/or sensing circuitry configured to sense information about a surrounding environment of the first vehicle 10. For example, and without limitation, the sensing unit 110 may include a position sensor 101 (e.g., a global positioning system (GPS), a differential GPS (DGPS), and an inertial navigation system (INS)), an IMU sensor 102, a lidar sensor 103, a radar sensor 104, an image sensor 105 (e.g. a camera, a stereo camera, a mono camera, a wide angle camera, an around view camera or a 3D vision sensor, etc.), an ultrasonic sensor 106, an infrared sensor 107, a distance sensor 108, a temperature/humidity sensor 109, an RGB sensor 111, and a traveling path sensing unit 112, but is not limited thereto. For example, the sensing unit 110 may include an air pressure sensor and a dust sensor.

The traveling path sensing unit 112 may sense a movement of the first vehicle 10 and may include, for example, and without limitation, a geomagnetic sensor 113, an acceleration sensor 114 and a gyroscope sensor 115, but is not limited thereto.

According to an embodiment, the image sensor 105 may include a plurality of cameras. The plurality of cameras may be disposed at a plurality of locations inside or outside of the first vehicle 10. For example, three cameras may be arranged in a front part of the first vehicle 10, one camera may be disposed in a rear part, two cameras may be disposed in a left side part, and two cameras may be disposed in a right side part, but the present disclosure is not limited thereto.

The sensing unit 110 may also be configured as a combination of the image sensor 105 and the radar sensor 104 or a combination of the image sensor 105 and the lidar sensor 103. A function of each sensor may be intuitively deduced from the name by one of ordinary skill in the art, and thus a detailed description thereof is not provided here.

According to an embodiment, when the sensing unit 110 may sense at least one external vehicle located within a predetermined distance from the first vehicle 10, the sensing unit 110 may transmit sensed information about the at least one external vehicle to the processor 120.

The processor 120 may include various processing circuitry and may usually control the overall operation of the device 100. The processor 120 may control the sensing unit 110, the communicator 130, the output interface 150, the storage 160, and the input interface 170 by, for example, executing programs stored in the storage 160.

According to an embodiment, the processor 120 may include various processing circuitry, such as, for example, and without limitation, an artificial intelligence (AI) processor. The processor 120 may, for example, use a learning network model of an AI system to identify a type of the external vehicle and determine a risk of the external vehicle, and the like. Also, the processor 120 may use the learning network model of the AI system to plan a traveling path of the first vehicle 10.

The AI processor may, for example, be manufactured in the form of an AI dedicated hardware chip or may be manufactured as part of an existing general purpose processor (e.g., a CPU or an application processor) or a graphics dedicated processor (e.g., a GPU) and mounted on the device 100, but the present disclosure is not limited thereto.

According to an embodiment, the processor 120 may perceive the at least one external vehicle located within the predetermined distance from the first vehicle 10 using at least one sensor included in the sensing unit 110. According to another embodiment, the processor 120 may perceive the at least one external vehicle located within the predetermined distance from the first vehicle 10 using sensing information transmitted from the sensing unit 110 and a precision map. The perceiving of the at least one external vehicle may include perceiving of not only a presence of the at least one external vehicle, but also a type of the at least one external vehicle, a traveling lane of the at least one external vehicle, a traveling speed of the at least one external vehicle, but is not limited thereto.

According to an embodiment, the processor 120 may determine the risk of the at least one external vehicle, according to the type of the at least one external vehicle. The processor 120 may plan the traveling path of the first vehicle 10 based on the risk of the at least one external vehicle.

According to an embodiment, the processor 120 may perceive a high-risk second vehicle traveling in the rear of the same lane as a traveling lane of the first vehicle 10. When a distance between the second vehicle traveling in the rear and the first vehicle 10 is shorter than a safety distance previously defined according to a risk of the second vehicle, the processor 120 may determine that the traveling lane of the first vehicle 10 is changed or a traveling speed of the first vehicle 10 increases.

According to an embodiment, the processor 120 may perceive a third vehicle traveling in the rear of a second lane adjacent to a first lane that is the traveling lane of the first vehicle 10. Based on a distance between the third vehicle traveling in a next lane and the first vehicle 10 and a type of the third vehicle, the processor 120 may determine whether to change the traveling lane of the first vehicle 10 from the first lane to the second lane.

According to an embodiment, the processor 120 may perceive a fourth vehicle traveling in front of the same lane as the traveling lane of the first vehicle 10. At this time, when a distance between the first vehicle 10 and the fourth vehicle traveling in front of the first vehicle 10 is shorter than a safety distance previously defined according to a risk of the fourth vehicle, the processor 120 may determine that the traveling speed of the first vehicle 10 is reduced.

According to an embodiment, when the processor 120 changes the traveling lane of the first vehicle 10 from the first lane to the second lane, the processor 120 may perceive an external vehicle traveling in a third lane adjacent to the second lane. At this time, the processor 120 may predict a lane change speed or a lane change probability of the external vehicle based on a type of the external vehicle traveling in the third lane, and based on the predicted lane change speed or lane change probability of the external vehicle, may determine whether to change the traveling lane of the first vehicle 10 from the first lane to the second lane.

According to an embodiment, the processor 120 may perceive a fifth vehicle traveling in the rear of the same lane as the traveling lane of the first vehicle 10 and at least one sixth vehicle traveling in the rear of a lane different from the traveling lane of the first vehicle 10. The processor 120 may determine a risk of the fifth vehicle traveling in the rear of the same lane as the traveling lane of the first vehicle 10 and a risk of the at least one sixth vehicle traveling in the rear of the lane different from the traveling lane of the first vehicle 10, and determine a lane for the first vehicle 10 to stop based on the risk of the fifth vehicle and the risk of the at least one sixth vehicle.

According to an embodiment, the processor 120 may perceive a seventh vehicle that turns right at a front intersection of the first vehicle 10 and joins an adjacent lane of the lane in which the first vehicle 10 is traveling. The processor 120 may determine an intersection turning radius of the seventh vehicle and determine whether to decelerate the traveling speed of the first vehicle 10 or whether to change the lane of the first vehicle 10 based on the intersection turning radius of the seventh vehicle.

According to an embodiment, the processor 120 may predict a blind spot of a driver of the at least one external vehicle traveling in the lane different from the traveling lane of the first vehicle 10 based on a type of the at least one external vehicle. At this time, the processor 120 may determine the traveling speed of the first vehicle 10 based on the predicted blind spot. For example, the processor 120 may accelerate or decelerate the traveling speed of the first vehicle 10 to avoid the blind spot when it is determined that the first vehicle 10 is within the predicted blind spot.

According to an embodiment, the processor 120 may output information for guiding the traveling path of the first vehicle 10 through the output interface 150 or control the traveling path of the first vehicle 10 based on a result of planning the traveling path of the first vehicle 10.

The communicator 130 may include various communication circuitry including at least one antenna for wirelessly communicating with another device (e.g., an external vehicle or an external server). For example, the communicator 130 may include one or more components that allow communication between the first vehicle 10 and the external vehicle or between the first vehicle 10 and a server. For example, the communicator 130 may include various communication circuitry, such as, for example, and without limitation, a short-range wireless communicator (e.g., including short-range wireless communication circuitry) 131, a mobile communicator (e.g., including mobile communication circuitry) 132, and a broadcast receiver (e.g., including broadcast receiving circuitry) 133, but is not limited thereto.

The short-range wireless communicator 131 may include various communication circuitry, such as, for example, and without limitatoin, a Bluetooth communicator, a Bluetooth low energy (BLE) communicator, a near field communicator/radio frequency identification communicator (NFC/RFID), a WLAN communicator, a Zigbee communicator, an infrared data association (IrDA) communicator (not shown), a Wi-Fi direct (WFD) communicator, a ultra wideband (UWB) communicator, an Ant+communicator, a microwave (uWave) communicator (not shown), and the like, but is not limited thereto.

The mobile communicator 132 may transmit and receive a wireless signal to and from at least one of a base station, an external terminal, and a server on a mobile communication network. The wireless signal may include various types of data according to a voice call signal, a video call signal, or a text/multimedia message transmission and reception.

The broadcast receiver 133 may receive broadcast signals and/or broadcast-related information from outside through a broadcast channel. The broadcast channel may include a satellite channel and a terrestrial channel. The device 100 may not include the broadcast receiver 133 according to an implementation example.

According to an embodiment, the communicator 130 may perform vehicle to vehicle communication with the second vehicle located within a predetermined distance from the first vehicle 10 or vehicle to infrastructure (V2I) with infra located within a predetermined distance from the first vehicle 10. For example, the communicator 130 may broadcast or advertise a packet including identification information, a position, a speed, etc. of the first vehicle 10. Further, the communicator 130 may receive a packet broadcasted or advertised by the second vehicle.

The driving unit 140 may include configurations used for driving (running) the first vehicle 10 and for operating devices inside the first vehicle 10. The driving unit 140 may include various circuitry, such as, for example, and without limitation, at least one of a power supply unit 141, a propelling unit 142, a traveling unit 143, and a peripheral device unit 144, but is not limited thereto.

The peripheral device unit 144 may include various circuitry, such as, for example, and without limitation, a navigation system, a light, a turn signal light, a wiper, an internal light, a heater, and an air conditioner. The navigation system may be a system configured to determine a running route of the first vehicle 10. The navigation system may be configured to dynamically update the running route while the first vehicle 10 is traveling. For example, the navigation system may utilize data collected by a GPS module to determine the running route of the first vehicle 10.

The output interface 150 may include various output circuitry and be used to output an audio signal, a video signal, or a vibration signal. The output interface 150 may include, for example and without limitation, a display 151, a sound output interface 152, a vibration motor 153, and the like.

The display 151 may display and output information processed in the device 100. For example, the display 151 may display a map including a traveling path, display positions of external vehicles, display blind spots of drivers of the external vehicles, or display information for guiding a current speed, a remaining fuel amount, the running route of the first vehicle 10, and the like, but is not limited thereto. The display 151 may display a user interface (UI) or a graphic user interface (GUI) associated with a call in a call mode.

Meanwhile, when the display 151 and a touch pad have a layer structure and are configured as a touch screen, the display 151 may be used as an input device in addition to an output device. The display 151 may include, for example, and without limitation, at least one of a liquid crystal display, a thin film transistor-liquid crystal display, an organic light-emitting diode, a flexible display, a three-dimensional (3D) display, an electrophoretic display, or the like. The device 100 may include two or more displays 151 according to an implementation of the device 100.

According to an embodiment, the display 151 may include a transparent display. The transparent display may be realized, for example, and without limitation, in a projection type as well as a transparent liquid crystal display (LCD) type, a transparent thin-film electroluminescent panel (TFEL) type, a transparent OLED type, or the like. The projection type may refer, for example, to a method of projecting and displaying an image on a transparent screen such as a head up display (HUD).

The sound output interface 152 may include various sound output circuitry and output audio data received from the communicator 130 or stored in the storage 160. Further, the sound output interface 152 may output an acoustic signal related to a function performed in the first vehicle 10. For example, the sound output interface 152 may output a voice message for guiding the traveling path of the first vehicle 10. The sound output interface 152 may include various sound output circuitry, such as, for example, and without limitation, a speaker, a buzzer, and the like.

The vibration motor 153 may output a vibration signal. For example, the vibration motor 153 may output the vibration signal corresponding to an output of audio data or video data (e.g., a warning message, etc.)

The storage 160 may store a program for processing and controlling the processor 120 and may store input/output data (e.g., image information of an external vehicle, road situation information, characteristic information according to a type of the vehicle, risk/safety distance information according to the type of external vehicle, etc.) The storage 160 may include, for example, and without limitation, at least one type of storage medium of a flash memory type, a hard disk type, a multimedia card micro type, a card type memory (for example, SD or XD memory), random access memory (RAM), a static random access memory (SRAM), read only memory (ROM), electrically erasable programmable read-only memory (EEPROM), programmable read-only memory (PROM), a magnetic memory, a magnetic disk, an optical disk, or the like. Also, the device 100 may operate a web storage or a cloud server that performs a storage function on the Internet.

The input interface 170 may refer, for example, to a unit for a user to input data for controlling the first vehicle 10. For example, the input interface 170 may include various input circuitry, such as, for example, and without limitation, a key pad, a dome switch, a touch pad (contact type capacitance type, pressure type resistive type, infrared ray detection type, surface ultrasonic wave conduction type, an integral tension measurement type, a piezo effect type, etc.), a jog wheel, a jog switch, and the like, but is not limited thereto.

FIG. 22 is a block diagram illustrating an example configuration of a vehicle according to an embodiment.

Referring to FIG. 22, the first vehicle 10 may include the device 100 and a traveling device 200. In FIG. 22, only components related to the present embodiment are shown. Therefore, it will be understood by one of ordinary skill in the art that the first vehicle 10 may further include general components other than the components shown in FIG. 22.

The device 100 may include the sensing unit 110 and the processor 120. The device 100 is described in detail with reference to FIG. 21, and thus a redundant description of the device 100 will not be repeated here.

The traveling device 200 may include a brake unit 221, a steering unit 222, and a throttle 223.

The brake unit 221 may be a combination of mechanisms configured to decelerate the first vehicle 10. For example, the brake unit 221 may use friction to reduce the speed of wheels/tires.

The steering unit 222 may be a combination of mechanisms configured to adjust a direction of the first vehicle 10.

The throttle 223 may be a combination of mechanisms configured to control an operating speed of an engine/motor to control the speed of the first vehicle 10. Also, the throttle 223 may adjust an amount of a fuel gas mixture flowing into the engine/motor by adjusting a throttle opening amount. Power and thrust may be controlled by adjusting the throttle opening amount.

The processor 120 may plan a traveling path of the first vehicle 10 based on information sensed by the sensing unit 110. Then, the processor 120 may control the brake unit 221, the steering unit 222, and the throttle 223 according to the planned traveling path. Therefore, according to an embodiment, the first vehicle 10 may perform a lane change or a speed adjustment by itself without the intervention of a driver.

A method according to an embodiment may be embodied as program commands executable by various computer means and may be recorded on a computer-readable recording medium. The computer-readable recording medium may include program commands, data files, data structures, and the like separately or in combinations. The program commands to be recorded on the computer-readable recording medium may be specially designed and configured for embodiments of the present disclosure or may be well-known to and be usable by one of ordinary skill in the art of computer software. Examples of the computer-readable recording medium include a magnetic medium such as a hard disk, a floppy disk, or a magnetic tape, an optical medium such as a compact disk read-only memory (CD-ROM) or a digital versatile disk (DVD), a magneto-optical medium such as a floptical disk, and a hardware device specially configured to store and execute program commands such as a ROM, a RAM, or a flash memory. Examples of the program commands are advanced language codes that may be executed by a computer using an interpreter or the like as well as codes made by a compiler.

Some embodiments may be implemented as a recording medium including computer-readable instructions such as a computer-executable program module. The computer-readable medium may be an arbitrary available medium accessible by a computer, and examples thereof include all volatile and non-volatile media and separable and non-separable media. Further, examples of the computer-readable medium may include a computer storage medium and a communication medium. Examples of the computer storage medium include all volatile and non-volatile media and separable and non-separable media, which are implemented by an arbitrary method or technology, for storing information such as computer-readable instructions, data structures, program modules, or other data. The communication medium typically includes computer-readable instructions, data structures, program modules, other data of a modulated data signal, or other transmission mechanisms, and examples thereof include an arbitrary information transmission medium. Also, some embodiments may be implemented as a computer program or a computer program product including computer-executable instructions such as a computer program executed by a computer.

It should be understood that the various example embodiments described herein should be considered in a descriptive sense only and not for purposes of limitation. Descriptions of features or aspects within each embodiment should typically be considered as available for other similar features or aspects in other embodiments.

While one or more example embodiments have been described with reference to the figures, it will be understood by those of ordinary skill in the art that various changes in form and details may be made therein without departing from the spirit and scope as defined, for example, by the following claims.

What is claimed is:

1. A method of planning a traveling path of a first vehicle, performed by a device included in the first vehicle, the method comprising:
    detecting at least one external vehicle located within a predetermined distance from the first vehicle using at least one sensor;
    determining a risk due to the at least one external vehicle based on a type of the at least one external vehicle; and
    planning the traveling path of the first vehicle based on the risk due to the at least one external vehicle,
    wherein the detecting of the at least one external vehicle comprises: determining the type of the at least one external vehicle based on a size, a weight, and a performance of the at least one external vehicle.

2. The method of claim 1, wherein the at least one external vehicle comprises: a high-risk second vehicle traveling in a rear of the first vehicle and in a same lane as a traveling lane of the first vehicle,
    wherein the planning of the traveling path of the first vehicle comprises: changing the traveling lane of the first vehicle and/or increasing a traveling speed of the first vehicle based on a distance between the second vehicle and the first vehicle being less than a safety distance previously defined based on a risk due to the second vehicle.

3. The method of claim 1, wherein the at least one external vehicle comprises: a third vehicle traveling in a rear of the first vehicle and in a second lane adjacent to a first lane, the first lane being a traveling lane of the first vehicle,
    wherein the planning of the traveling path of the first vehicle comprises: determining whether to change the traveling lane of the first vehicle from the first lane to a second lane based on a type of the third vehicle and a distance between the first vehicle and the third vehicle.

4. The method of claim 3, wherein the determining whether to change the traveling lane of the first vehicle comprises:
    when the third vehicle is a low-risk vehicle, determining to change the traveling lane of the first vehicle from the first lane to the second lane based on the distance between the first vehicle and the third vehicle being greater than a first safety distance; and
    when the third vehicle is a high-risk vehicle, determining to change the traveling lane of the first vehicle from the first lane to the second lane based on the distance between the first vehicle and the third vehicle being greater than a second safety distance.

5. The method of claim 1, wherein the at least one external vehicle comprises: a fourth vehicle traveling in front of the first vehicle and in a same lane as a traveling lane of the first vehicle,
    wherein the planning of the traveling path of the first vehicle comprises: determining to reduce a traveling speed of the first vehicle based on a distance between the first vehicle and the fourth vehicle being less than a safety distance previously defined based on a risk due to the fourth vehicle.

6. The method of claim 1, wherein the detecting of the at least one external vehicle comprises:
    perceiving an external vehicle traveling in a third lane adjacent to a second lane based on a traveling lane of the first vehicle being changed from a first lane to the second lane, and
    wherein the planning of the traveling path of the first vehicle comprises:
    predicting a lane change speed and/or a lane change probability of the external vehicle based on a type of the external vehicle traveling in the third lane; and
    determining whether to change the traveling lane of the first vehicle from the first lane to the second lane based on the predicted lane change speed and/or lane change probability of the external vehicle.

7. The method of claim 1, wherein the planning of the traveling path of the first vehicle comprises:
    determining a risk due to a fifth vehicle traveling in a rear of the first vehicle and in a same lane as a traveling lane of the first vehicle and a risk due to at least one sixth vehicle traveling in a rear of the first vehicle and in a lane different from the traveling lane of the first vehicle; and
    determining a lane in which to stop the first vehicle based on the risk due to the fifth vehicle and the risk due to the at least one sixth vehicle.

8. The method of claim 7, wherein the determining of the lane in which to stop the first vehicle comprises:
    determining to stop the first vehicle in a current traveling lane based on the risk due to the fifth vehicle being less than or equal to the risk due to the at least one sixth vehicle; and
    determining to stop the first vehicle in a different lane from the current traveling lane based on the risk due to the fifth vehicle being greater than the risk due to the at least one sixth vehicle.

9. The method of claim 1, wherein the at least one external vehicle comprises: a seventh vehicle that turns right at an intersection in front of the first vehicle and joins an adjacent lane of a lane in which the first vehicle is traveling,
    wherein the planning of the traveling path of the first vehicle comprises:
    determining an intersection turning radius of the seventh vehicle; and determining whether to decelerate a traveling speed of the first vehicle and/or to change the lane of the first vehicle based on the intersection turning radius of the seventh vehicle.

10. The method of claim 1, wherein the planning of the traveling path of the first vehicle comprises:
predicting a blind spot of a driver of the at least one external vehicle in a lane different from a traveling lane of the first vehicle based on a type of the at least one external vehicle; and
determining a traveling speed of the first vehicle based on the blind spot of the driver.

11. The method of claim 1, further comprising providing information for maneuvering the first vehicle and/or controlling a maneuver of the first vehicle based on a result of planning the traveling path of the first vehicle.

12. The method of claim 2, wherein planning the traveling path of the first vehicle is performed based on the determined risk, a current distance between the first vehicle and the at least one external vehicle, and a preset safety distance associated with the determined type of the at least one external vehicle.

13. A device included in a first vehicle, the device comprising:
a sensing unit comprising at least one sensor; and
a processor configured to: detect at least one external vehicle located within a predetermined distance from the first vehicle using the at least one sensor, determine a risk due to the at least one external vehicle based on a type of the at least one external vehicle;
and plan a traveling path of the first vehicle based on the risk due to the at least one external vehicle,
wherein the detecting of the at least one external vehicle comprises: determining the type of the at least one external vehicle based on a size, a weight, and a performance of the at least one external vehicle.

14. The device of claim 13, wherein the at least one external vehicle comprises: a high-risk second vehicle traveling in a rear of the first vehicle and in a same lane as a traveling lane of the first vehicle,
wherein the processor is further configured to change the traveling lane of the first vehicle and/or increase a traveling speed of the first vehicle based on a distance between the second vehicle and the first vehicle being less than a safety distance previously defined based on a risk due to the second vehicle.

15. The device of claim 14, wherein the at least one external vehicle comprises: a third vehicle traveling in a rear of the first vehicle and in a second lane adjacent to a first lane, the first lane being the traveling lane of the first vehicle,
wherein the processor is further configured to determine whether to change the traveling lane of the first vehicle from the first lane to the second lane based on a distance between the first vehicle and the third vehicle and a type of the third vehicle.

16. The device of claim 14, wherein the at least one external vehicle comprises: a fourth vehicle traveling in front of the first vehicle and in a same lane as the traveling lane of the first vehicle,
wherein the processor is further configured to determine to reduce a traveling speed of the first vehicle based on a distance between the first vehicle and the fourth vehicle being less than a safety distance previously defined based on a risk due to the fourth vehicle.

17. The device of claim 14, wherein, based on a traveling lane of the first vehicle being changed from a first lane to a second lane, the at least one external vehicle is detected to be traveling in a third lane adjacent to the second lane, and
wherein the processor is further configured to predict a lane change speed and/or a lane change probability of the external vehicle based on a type of the external vehicle traveling in the third lane and to determine whether to change the traveling lane of the first vehicle from the first lane to the second lane based on the predicted lane change speed and/or lane change probability of the external vehicle.

18. The device of claim 14, wherein the processor is further configured to determine a risk due to a fifth vehicle traveling in a rear of the first vehicle and in a same lane as the traveling lane of the first vehicle and a risk due to at least one sixth vehicle traveling in a rear of the first vehicle and in a lane different from the traveling lane of the first vehicle and to determine a lane in which to stop the first vehicle based on the risk due to the fifth vehicle and the risk due to the at least one sixth vehicle.

19. The device of claim 14, wherein the processor is further configured to provide, through an output interface, information for maneuvering the first vehicle and/or control a maneuver of the first vehicle based on a result of planning the traveling path of the first vehicle.

20. A computer program product comprising a non-transitory computer readable storage medium having recorded thereon a program which, when executed by a computing device, causes an electronic device to perform operations comprising:
detecting at least one external vehicle located within a predetermined distance from a first vehicle using at least one sensor;
determining a risk due to the at least one external vehicle based on a type of the at least one external vehicle; and
planning a traveling path of the first vehicle based on the risk due to the at least one external vehicle,
wherein the detecting of the at least one external vehicle comprises: determining the type of the at least one external vehicle based on a size, a weight, and a performance of the at least one external vehicle.

* * * * *